(12) United States Patent
Ogura

(10) Patent No.: US 9,513,023 B2
(45) Date of Patent: Dec. 6, 2016

(54) MANAGEMENT APPARATUS FOR AIR-CONDITIONING SYSTEM

(75) Inventor: Kazutaka Ogura, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 601 days.

(21) Appl. No.: 13/984,972

(22) PCT Filed: Mar. 16, 2011

(86) PCT No.: PCT/JP2011/001524
§ 371 (c)(1),
(2), (4) Date: Aug. 12, 2013

(87) PCT Pub. No.: WO2012/123989
PCT Pub. Date: Sep. 20, 2012

(65) Prior Publication Data
US 2014/0005838 A1    Jan. 2, 2014

(51) Int. Cl.
*F24F 11/00* (2006.01)
*H04L 12/24* (2006.01)
(Continued)

(52) U.S. Cl.
CPC .......... *F24F 11/0086* (2013.01); *F24F 11/022* (2013.01); *G05B 15/02* (2013.01);
(Continued)

(58) Field of Classification Search
CPC .............. G05B 19/02; G05B 19/41885; G05B 2219/32085; H04L 12/2803; H04L 2012/285; Y10S 707/99945; Y10S 707/9948; Y02P 90/10; Y02P 90/20; Y02P 90/24; Y02P 90/26
See application file for complete search history.

(56) References Cited

U.S. PATENT DOCUMENTS 6,792,319 B1    9/2004  Bilger
7,080,096 B1 *  7/2006  Imamura ................ G06Q 30/06
(Continued)

FOREIGN PATENT DOCUMENTS

JP    09-257297 A    9/1997
JP    10-061994 A    3/1998
(Continued)

OTHER PUBLICATIONS

Office Action mailed Oct. 7, 2014 for the corresponding JP Application No. 2013-504400 (with English translation).
(Continued)

Primary Examiner — Crystal J Barnes-Bullock
(74) Attorney, Agent, or Firm — Posz Law Group, PLC

(57) ABSTRACT

A management apparatus for an air-conditioning system is obtained which can divide a layout drawing into regions for each monitored space and establish correspondence between each equipment device arranged in individual regions and its block identification information. On the basis of positional information and block information, block information for a region corresponding to an installation position is assigned to each equipment device and a plurality of equipment devices are divided for each piece of the block information to perform at least one of monitoring of status and control of an operation.

20 Claims, 15 Drawing Sheets

(51) Int. Cl.
*G05B 19/418* (2006.01)
*G05B 23/02* (2006.01)
*F24F 11/02* (2006.01)
*G05B 15/02* (2006.01)

(52) U.S. Cl.
CPC ... *G05B 19/41885* (2013.01); *G05B 23/0224* (2013.01); *H04L 41/22* (2013.01); *F24F 2011/0091* (2013.01); *G05B 2219/2642* (2013.01); *G05B 2219/32085* (2013.01)

(56) References Cited

U.S. PATENT DOCUMENTS

| | | | | |
|---|---|---|---|---|
| 8,566,065 | B2* | 10/2013 | Fukuda | G05B 19/41885 703/1 |
| 2003/0036983 | A1* | 2/2003 | Hougen | G06Q 10/087 705/28 |
| 2005/0212663 | A1* | 9/2005 | Matsumoto | G06Q 10/087 340/309.6 |
| 2007/0075990 | A1* | 4/2007 | Sahashi | G06F 3/1204 345/181 |
| 2008/0125873 | A1 | 5/2008 | Payne et al. | |
| 2010/0274536 | A1* | 10/2010 | Okada | G05B 19/41885 703/1 |

FOREIGN PATENT DOCUMENTS

| | | | |
|---|---|---|---|
| JP | 2003-52093 A | | 2/2003 |
| JP | 2005-198252 A | | 7/2005 |
| JP | 2007-040584 A | | 2/2007 |
| JP | 2007066585 A | * | 3/2007 |
| JP | 2008-529121 A | | 7/2008 |
| JP | 2009003788 A | * | 1/2009 |
| JP | 4266558 B2 | | 2/2009 |
| JP | 2009-265972 A | | 11/2009 |
| JP | 2010-014291 A | | 1/2010 |
| JP | 2010-133665 A | | 6/2010 |
| JP | 2010-261643 A | | 11/2010 |

OTHER PUBLICATIONS

Extended European Search Report mailed Aug. 1, 2014 for the corresponding EP Application No. 11860783.7 (in English).
International Search Report of the International Searching Authority mailed Jun. 14, 2011 for the corresponding international application No. PCT/JP2011/001524 (with English translation).
Chinese Office Action issued on Jul. 9, 2015 in the corresponding CN application No. 201180069257.7(English translation attached).
Japanese Office Action mailed on Jun. 30, 2015 in the corresponding JP application No. 2013-504400. ( English translation attached ).
Office Action dated Mar. 18, 2016 issued in corresponding CN patent application No. 201180069257.7 (and English translation).
Office Action dated Aug. 23, 2016 issued in corresponding CN patent application No. 201180069257.7 (and English translation).

* cited by examiner

200: LAYOUT DRAWING

FIG. 3

300: POSITIONAL INFORMATION

| EQUIPMENT DEVICE ID | EQUIPMENT DEVICE NAME | EQUIPMENT ICON ID | COORDINATE X | COORDINATE Y |
|---|---|---|---|---|
| 1 | CONFERENCE ROOM A AIR-CONDITIONING 1 | 2 | 200 | 200 |
| 2 | CONFERENCE ROOM B AIR-CONDITIONING 2 | 2 | 450 | 200 |
| 3 | COMPUTER ROOM AIR-CONDITIONING 1 | 3 | 250 | 650 |
| 4 | COMPUTER ROOM AIR-CONDITIONING 2 | 3 | 400 | 650 |
| 5 | ROOM A AIR-CONDITIONING 1 | 1 | 600 | 250 |
| 6 | ROOM A AIR-CONDITIONING 2 | 1 | 800 | 250 |
| 7 | ROOM A AIR-CONDITIONING 3 | 1 | 600 | 500 |
| 8 | ROOM A AIR-CONDITIONING 4 | 1 | 800 | 500 |
| 9 | ROOM A LIGHTING 1 | 4 | 700 | 400 |
| 10 | COMPUTER ROOM KEY 1 | 6 | 300 | 550 |
| 11 | CORRIDOR VENTILATION 1 | 5 | 500 | 750 |

FIG. 4

 201     204

 202    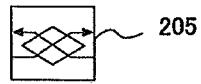 205

 203    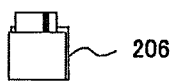 206

F I G. 5
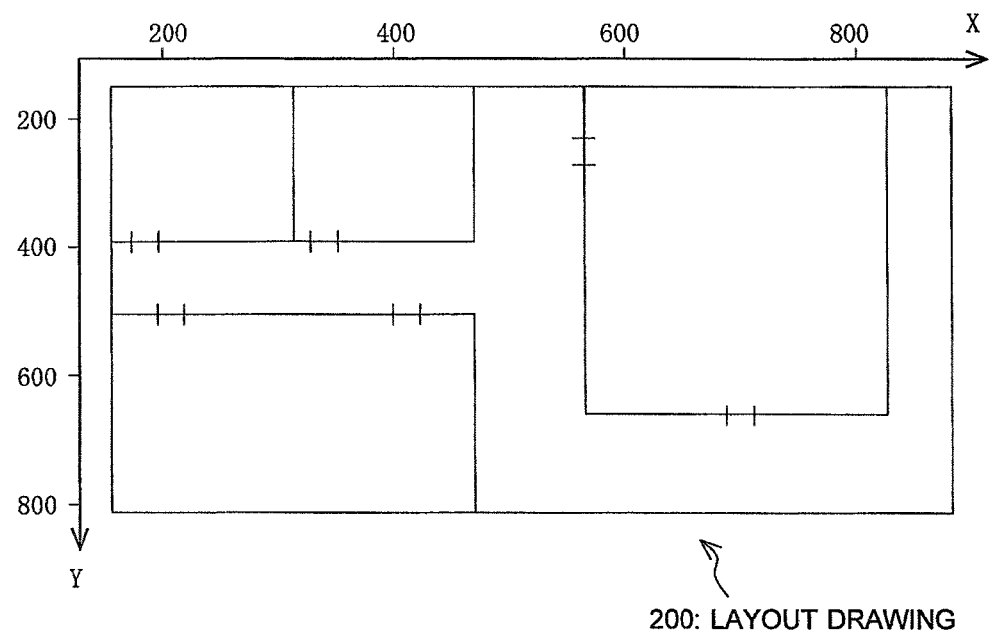
200: LAYOUT DRAWING

400: BLOCK DRAWING
GREEN  BLUE  MAGENTA
RED  BLACK  YELLOW

500: BLOCK INFORMATION

| BLOCK NUMBER | IMAGE COLOR (R, G, B) | BLOCK TYPE |
|---|---|---|
| 1 | 0, 255, 0 | CONFERENCE ROOM A |
| 2 | 0, 0, 255 | CONFERENCE ROOM B |
| 3 | 255, 0, 0 | COMPUTER ROOM |
| 4 | 255, 0, 255 | ROOM A |
| 5 | 255, 255, 0 | ROOM A |
| 6 | 0, 0, 0 | CORRIDOR |

FIG. 8
(a)
 201   204
 202  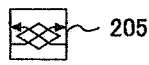 205
 203  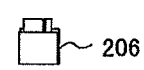 206
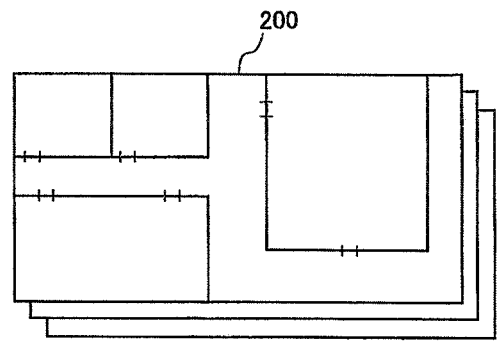 200
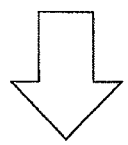
(b)
200
CONFERENCE ROOM A  CONFERENCE ROOM B  ROOM A
202
 201   201
 206
 204
 203  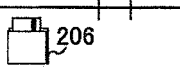 203
 201   201
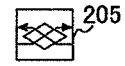 205
COMPUTER ROOM    CORRIDOR

FIG. 12

600: CAPACITY INFORMATION

| EQUIPMENT DEVICE ID | INSTALLATION ANGLE | HORIZONTAL AIRFLOW DIRECTION RANGE ANGLE | NUMBER OF OUTLETS | OUTLET DIRECTION | MAXIMUM AIRFLOW REACHING DISTANCE |
|---|---|---|---|---|---|
| 1 | 315° | 45° | ONE DIRECTION | 0° | 3.0 m |
| 2 | 225° | 45° | ONE DIRECTION | 0° | 3.0 m |
| 3 | 0° | 60° | TWO DIRECTIONS | 0°, 180° | 2.0 m |
| 4 | 0° | 60° | TWO DIRECTIONS | 0°, 180° | 2.0 m |
| 5 | 0° | 60° | FOUR DIRECTIONS | 0°, 90°, 180°, 270° | 1.5 m |
| 6 | 0° | 60° | FOUR DIRECTIONS | 0°, 90°, 180°, 270° | 1.5 m |
| 7 | 0° | 60° | FOUR DIRECTIONS | 0°, 90°, 180°, 270° | 1.5 m |
| 8 | 0° | 60° | FOUR DIRECTIONS | 0°, 90°, 180°, 270° | 1.5 m |

FIG. 13

700: STATUS DATA

| EQUIPMENT DEVICE ID | RUN/STOP | OPERATION MODE | AIRFLOW DIRECTION SETTING | AIRFLOW VELOCITY SETTING |
|---|---|---|---|---|
| 1 | RUN | COOLING | HORIZONTAL | 4 |
| 2 | RUN | DRY | SWING | 4 |
| 3 | RUN | COOLING | DIAGONAL 1 | 2 |
| 4 | STOP | COOLING | DIAGONAL 1 | 2 |
| 5 | RUN | COOLING | DIAGONAL 2 | 1 |
| 6 | RUN | COOLING | DIAGONAL 2 | 1 |
| 7 | RUN | COOLING | DIAGONAL 2 | 1 |
| 8 | RUN | COOLING | DIAGONAL 2 | 1 |

FIG. 15
(a)
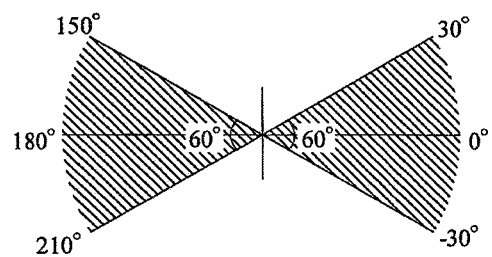
(b)
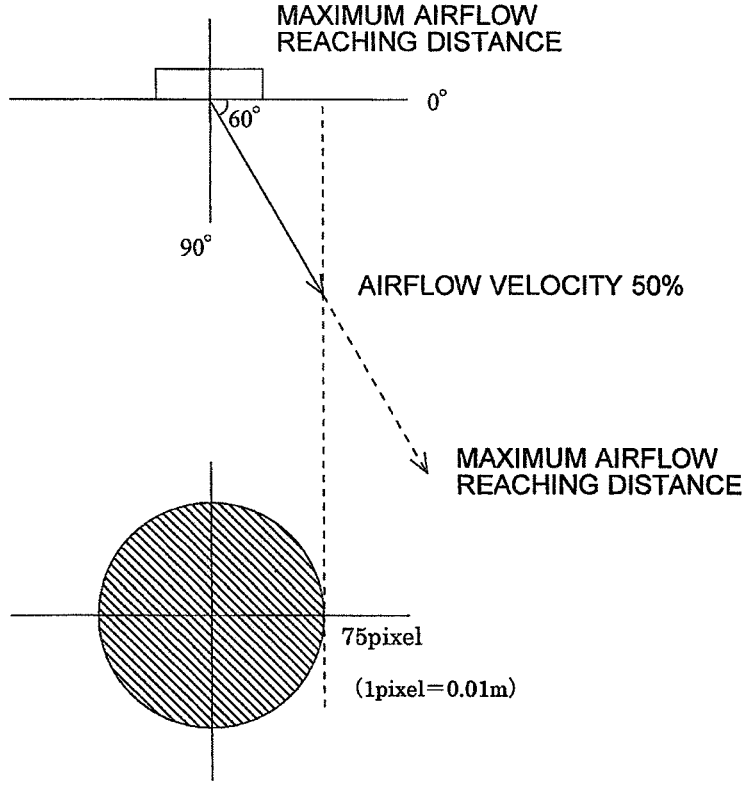
(c)
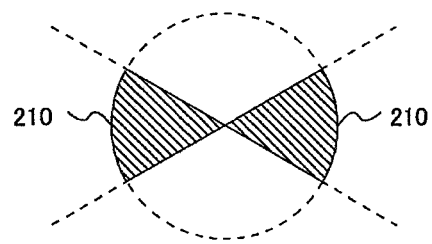

(1pixel=0.01m)

FIG. 20
(a)
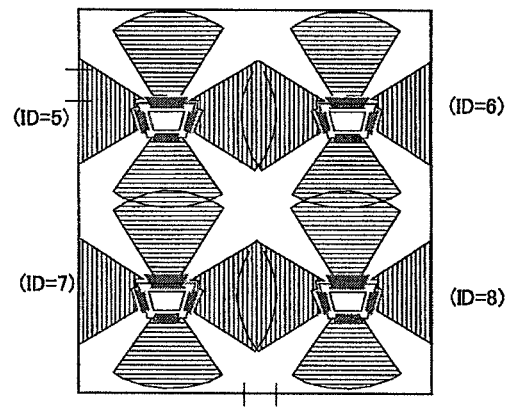
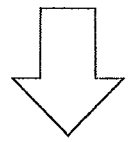
(b)
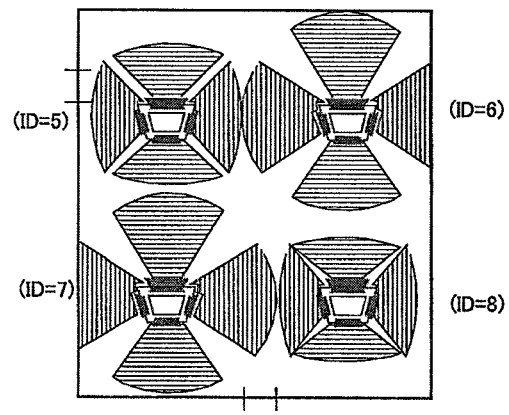

FIG. 21

800: INTERLOCK SETTING INFORMATION 

| INTERLOCK SOURCE DEVICE | INTERLOCK CONDITION | INTERLOCK TARGET DEVICE | INTERLOCK OPERATION |
|---|---|---|---|
| LIGHTING UNIT | OFF | AIR-CONDITIONING UNIT | STOP |
| LIGHTING UNIT | ON | AIR-CONDITIONING UNIT | RUN |
| CARD KEY | ON | AIR-CONDITIONING UNIT | RUN |
| | | LIGHTING UNIT | ON |
| CARD KEY | OFF | AIR-CONDITIONING UNIT | STOP |
| | | LIGHTING UNIT | OFF |

FIG. 22

900: SCHEDULE SETTING INFORMATION 

| BLOCK TYPE | TIME | | | | | | | | | | | |
|---|---|---|---|---|---|---|---|---|---|---|---|---|
| | 7 | 8 | 9 | 10 | 11 | 12 | 13 | 14 | 15 | 16 | 17 | 18 |
| CONFERENCE ROOM A | — | — | ○ | ○ | ○ | — | — | — | — | — | — | — |
| CONFERENCE ROOM B | — | — | — | ○ | ○ | — | — | — | ○ | — | — | ○ |
| COMPUTER ROOM | ○ | ○ | ○ | ○ | ○ | ○ | ○ | ○ | ○ | ○ | ○ | ○ |
| ROOM A | — | ○ | ○ | ○ | ○ | — | ○ | ○ | ○ | ○ | ○ | — |

MANAGEMENT APPARATUS FOR AIR-CONDITIONING SYSTEM

CROSS REFERENCE TO RELATED APPLICATIONS

This application is a U.S. national stage application of International Application No. PCT/JP2011/001524 filed on Mar. 16, 2011.

TECHNICAL FIELD

The present invention relates to a management apparatus for an air-conditioning system, which controls operation of a plurality of equipment devices including at least an air-conditioning unit.

BACKGROUND ART

In related art, for example, there has been proposed an air-conditioning equipment management system which "displays a plan view, equipment icons, and operational status of equipment on a Web browser screen on the display unit by using the program, on the basis of the operation data, the plan view information, and the positional information that are received from the communication management unit for operation terminal" (see, for example, Patent Literature 1).

CITATION LIST

Patent Literature

Patent Literature 1: Japanese Patent No. 4266558 (claim 1)

SUMMARY OF INVENTION

Technical Problem

In related art, an image of a plan view (layout drawing) and equipment icons are simply superimposed on each other and displayed, and information related to positions in the layout drawing is not utilized at all.

For example, there is a problem in that in the case of monitoring what operational status an equipment device installed in which room (monitored space) is in, or in the case of performing room-by-room control or the like, it is necessary to perform group setting manually by an input operation by the user, which is inconvenient.

Moreover, for management apparatuses that monitor/control a plurality of equipment devices, it is desired to allow easy visual recognition of the operational status of or the presence/absence of an abnormality in each equipment device installed in individual rooms in the layout drawing.

The present invention has been made to solve the above-mentioned problems, and accordingly a first object of the present invention is to obtain a management apparatus for an air-conditioning system which can divide a layout drawing into regions for each monitored space, and establish correspondence between each equipment device arranged in individual regions and its block identification information.

A second object of the present invention is to obtain a management apparatus for an air-conditioning system which can divide a layout drawing into regions for each monitored space, and provide easy visual recognition of the operational status of each equipment device in individual regions.

Solution to Problem

A management apparatus for an air-conditioning system according to the present invention is a management apparatus for an air-conditioning system which monitors status of and controls operation of a plurality of equipment devices including at least an air-conditioning unit, including a storage device configured to store information on a layout drawing indicating a layout of one or a plurality of monitored spaces, positional information indicating an installation position of each of the equipment devices in the layout drawing, and block information having range information and block identification information, the range information dividing the layout drawing into regions for at least each of the monitored spaces and indicating a range of each of the regions, the block identification information identifying each of the regions, a display device, and a controller configured to cause the display device to display the layout drawing that displays an installation position of each of the equipment devices, on a basis of the information on the layout drawing and the positional information, assign, to each of the equipment devices, the block identification information for the region corresponding to the installation position, on a basis of the positional information and the block information, and divide the plurality of equipment devices for each piece of the block identification information, and perform at least one of monitoring of status and control of an operation.

Advantageous Effects of Invention

The present invention makes it possible to divide a layout drawing into regions for each monitored space, and establish correspondence between each equipment device arranged in individual regions and its block identification information.

BRIEF DESCRIPTION OF DRAWINGS

FIG. 3 illustrates a data configuration of positional information according to Embodiment 1.

FIG. 4 illustrates equipment icons according to Embodiment 1.

FIG. 5 explains the definition of coordinates according to Embodiment 1.

FIG. 8 illustrates a layout drawing screen according to Embodiment 1.

FIG. 12 illustrates a data configuration of capacity information according to Embodiment 2.

FIG. 13 illustrates a data configuration of status data according to Embodiment 2.

FIG. 15 explains displaying of an airflow reaching range according to Embodiment 2.

FIG. 20 explains controlling of airflow reaching ranges according to Embodiment 2.

FIG. 21 illustrates a data configuration of interlock setting information according to Embodiment 6.

FIG. 22 illustrates a data configuration of schedule setting information according to Embodiment 8.

DESCRIPTION OF EMBODIMENTS

Embodiment 1.

Figure 1:
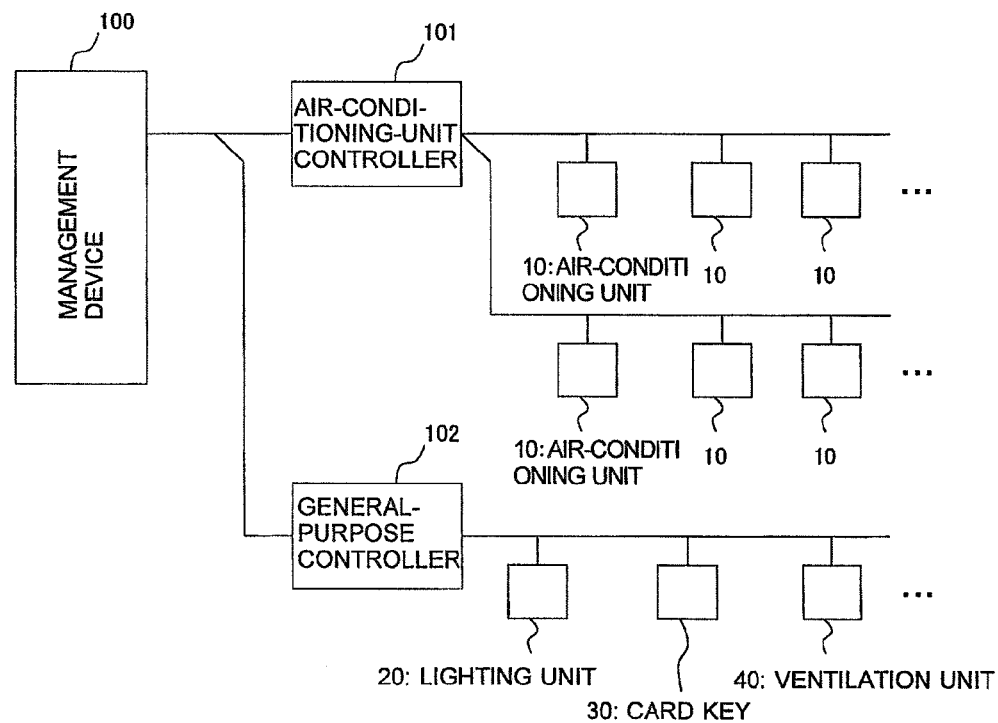
FIG. 1 illustrates a configuration of an air-conditioning system according to Embodiment 1.

FIG. 1 illustrates a configuration of an air-conditioning system according to Embodiment 1.

In FIG. 1, the air-conditioning system includes a management apparatus 100, an air-conditioning-unit controller 101, a general-purpose controller 102, an air-conditioning unit 10, a lighting unit 20, a card key 30, and a ventilation unit 40.

The "management apparatus 100" corresponds to the "management apparatus for an air-conditioning system" according to the present invention.

The "air-conditioning unit 10", "lighting unit 20", "card key 30", and "ventilation unit 40" each correspond to the "equipment device" according to the present invention.

In the following description, the "air-conditioning unit 10", "lighting unit 20", "card key 30", and "ventilation unit 40" will be also simply referred to as "equipment device" when not differentiated from each other.

The "equipment device" according to the present invention is not limited to this but it is possible to use any arbitrary number of arbitrary devices.

The management apparatus 100 is connected to one or a plurality of air-conditioning units 10 via a communication line, via the air-conditioning-unit controller 101.

The air-conditioning-unit controller 101 controls operation of each air-conditioning unit 10, on the basis of a control signal from the management apparatus 100 or a control signal from a remote control or the like for the air-conditioning unit 10.

The air-conditioning-unit controller 101 also acquires status data from each air-conditioning unit 10 and transmits the status data to the management apparatus 100.

The air-conditioning unit 10 operates on the basis of the control signal, and air-conditions an air-conditioned space in which the air-conditioning unit 10 is arranged. The air-conditioning unit 10 also transmits status data to the air-conditioning-unit controller 101.

Status data of the air-conditioning unit 10 includes information such as equipment device ID, run/stop, operation mode, airflow direction setting, airflow velocity setting, set temperature, indoor temperature, outside air temperature, and presence/absence of an abnormality. Details in this regard will be given later.

The management apparatus 100 is connected to the lighting unit 20, the card key 30, and the ventilation unit 40 via a communication line, via the general-purpose controller 102.

The general-purpose controller 102 controls operation of each equipment device, on the basis of a control signal from the management apparatus 100, or status data or the like from each equipment device.

The general-purpose controller 102 also transmits status data acquired from each equipment device to the management apparatus 100.

Status data of the lighting unit 20, the card key 30, and the ventilation unit 40 includes information such as equipment device ID, ON/OFF, and presence/absence of an abnormality.

The management apparatus 100 controls each equipment device in a centralized manner according to the configuration mentioned above.

The management apparatus 100 also assigns a block number (block identification information) described later to each equipment device, and divides a plurality of equipment devices for each block number to thereby monitor their status and control their operation.

Next, a configuration of the management apparatus 100 that performs the operation mentioned above will be described.

Figure 2:
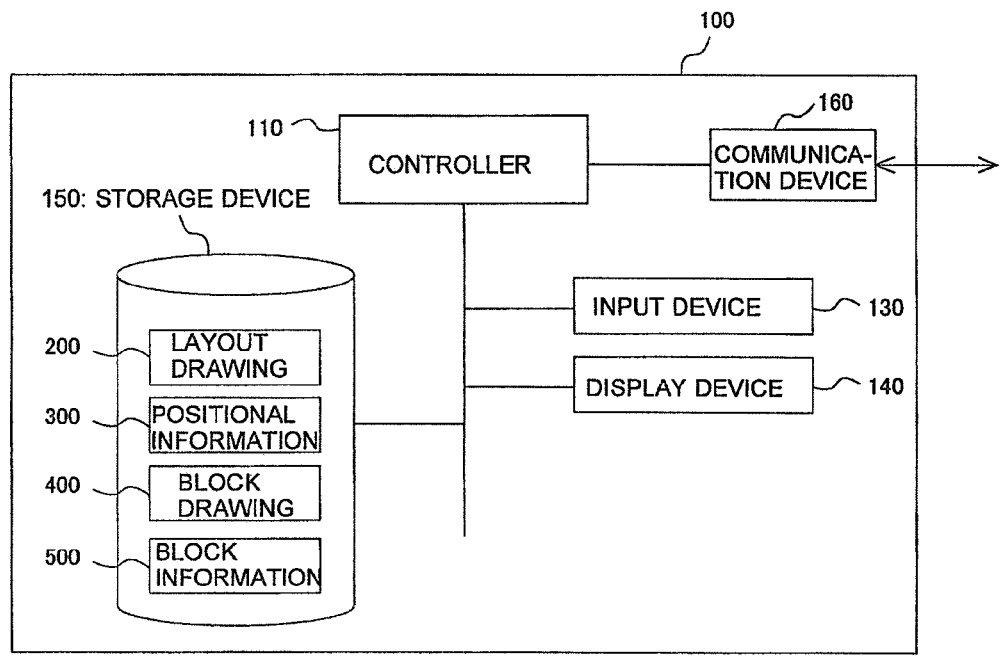
FIG. 2 illustrates a configuration of a management apparatus according to Embodiment 1.

FIG. 2 illustrates a configuration of the management apparatus 100 according to Embodiment 1.

As illustrated in FIG. 2, the management apparatus 100 includes a controller 110, an input device 130, a display device 140, a storage device 150, and a communication device 160.

The controller 110 controls each equipment device, on the basis of status data from each equipment device received by the communication device 160, or setting information or the like input from the input device 130.

The controller 110 also causes the display device 140 to display a layout drawing, and display information related to status data in correspondence with display of each equipment device within the layout drawing. Details in this regard will be given later.

The input device 130 is an interface for a user to input an operation for each equipment device.

The display device 140 displays a layout drawing, various menu screens, an operation input screen, and the like upon instruction from the controller 110.

The storage device 150 stores the following pieces of information: a layout drawing 200, positional information 300, a block drawing 400, and block information 500. Details in this regard will be given later.

The controller 110 can be implemented by hardware such as a circuit device that implements this function, or can be implemented as software executed on an arithmetic unit such as a microcomputer or a CPU.

The input device 130 can be configured by a touch panel, a keyboard, a mouse, or the like.

The display device 140 can be configured by an arbitrary device such as a liquid crystal display (LCD).

The storage device 150 can be configured by an arbitrary storage medium such as a hard disk drive (HDD) or a flash memory.

The communication device 160 can be configured by an arbitrary network interface such as a LAN interface.

The "communication device 160" corresponds to the "data acquiring device" according to the present invention.

The configuration of the management apparatus 100 according to Embodiment 1 has been described above.

Next, the layout drawing 200, the positional information 300, the block drawing 400, and the block information 500 that are stored in the storage device 150 will be described.

[Layout Drawing 200]

Figure 2A:
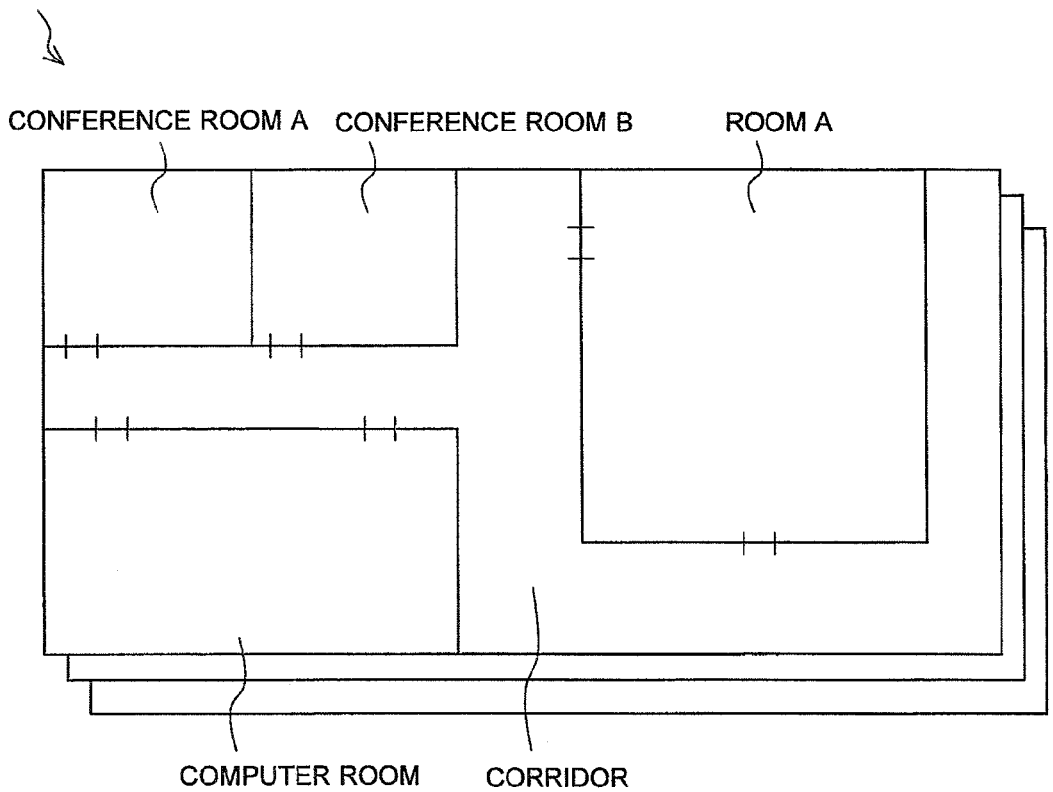
FIG. 2A illustrates a configuration of a layout drawing according to Embodiment 1.

FIG. 2A illustrates a configuration of a layout drawing according to Embodiment 1.

The layout drawing 200 is a layout drawing (plan view) indicating the layout of one or a plurality of monitored spaces in which each equipment device is installed.

In the example of FIG. 2A, the layout drawing 200 is configured by an image indicating the shapes/layout of conference rooms A and B, a computer room, a room A, and a corridor that are monitored spaces. In a case where there is one monitored space, an image showing only its shape may be used. In the layout drawing 200, structures such as doors, stairs, and pillars provided in the monitored space may be shown, or letters may be given.

A plurality of layout drawings 200 may be provided in accordance with the size, the number of floors, and the like of the monitored space. The layout drawing 200 is not limited to a plan view, but any arbitrary drawing such as a bird's-eye view may be used.

[Positional Information 300]

FIG. 3 illustrates a data configuration of positional information according to Embodiment 1.

The positional information 300 is information indicating the installation position of each equipment device in the layout drawing 200.

As illustrated in FIG. 3, the positional information 300 has equipment device ID, equipment device name, equipment icon ID, coordinate X, and coordinate Y.

The equipment device ID is information that identifies each equipment device. For example, the equipment device ID is a number unique to each individual equipment device.

The equipment device name is a name given to each individual equipment device. For example, the equipment device name is a name given on the basis of the name of the monitored space in which the corresponding equipment device is installed, the model of the equipment device, and the like. This information on equipment device name may be omitted.

The equipment icon ID is information that identifies an equipment icon (a figure indicating an equipment device) displayed in the layout drawing 200. For example, the equipment icon ID is information given in accordance with the model of an equipment device.

This equipment icon is stored in the storage device 150 in advance in accordance with the model of each equipment device to be monitored by the management apparatus 100.

For example, as illustrated in FIG. 4, the storage device 150 stores the following pieces of image information: an air-conditioning unit A display 201, an air-conditioning unit B display 202, an air-conditioning unit C display 203, a lighting unit display 204, a ventilation unit display 205, and a card key display 206. An equipment icon ID is given to each of the individual displays.

For example, the equipment icon ID of the air-conditioning unit A display 201 is "1". The equipment icon ID of the air-conditioning unit B display 202 is "2". The equipment icon ID of the air-conditioning unit C display 203 is "3". The equipment icon ID of the lighting unit display 204 is "4". The equipment icon ID of the ventilation unit display 205 is "5". The equipment icon ID of the card key display 206 is "6".

The coordinate X and the coordinate Y of the positional information 300 are pieces of information indicating a position where an equipment icon is to be displayed in the layout drawing 200. For example, as illustrated in FIG. 5, with the horizontal axis and vertical axis of the layout drawing 200 taken as an X-axis and a Y-axis, respectively, correspondence is established between pixels and coordinates in the layout drawing 200. For example, in the case of coordinates (X, Y)=(200, 200), the coordinates indicate a position that is 200 pixels to the right and 200 pixels down from the upper left edge of the screen. The definition of coordinates is not limited to this, but vector coordinates or the like may be used.

[Block Drawing 400]

Figures 6, 7:
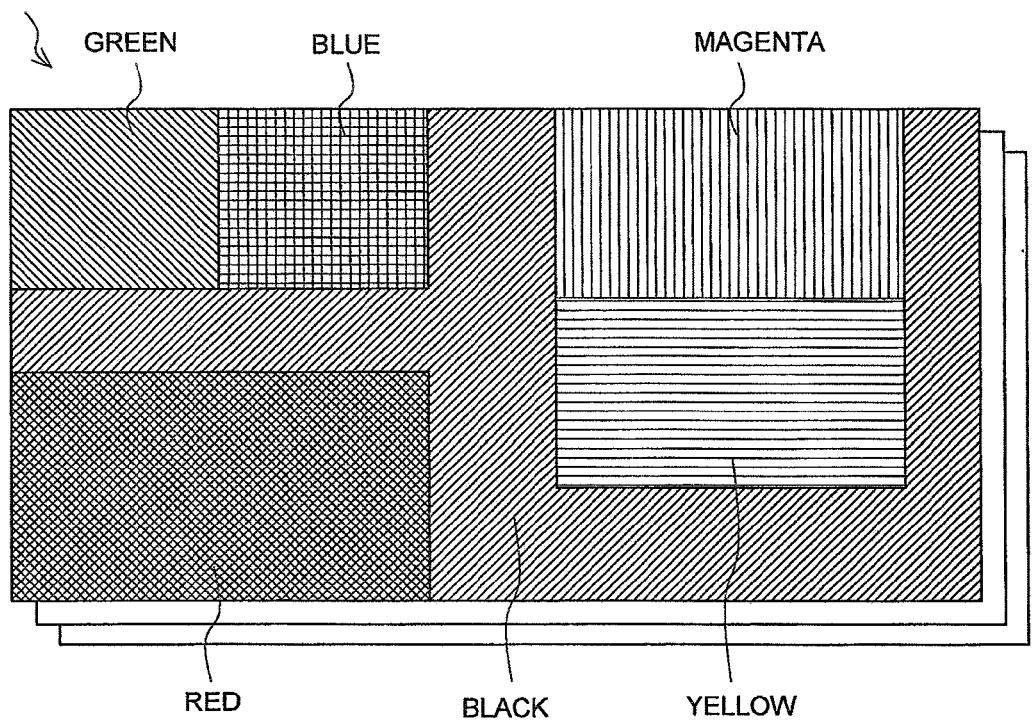
FIG. 6 illustrates a configuration of a block drawing according to Embodiment 1.
FIG. 7 illustrates a data configuration of block identification information according to Embodiment 1.

FIG. 6 illustrates a configuration of a block drawing according to Embodiment 1.

The block drawing 400 is information that divides the layout drawing 200 into regions for at least each monitored space, and indicates the range of each of the regions. For example, the block drawing 400 is information on an image in which the layout drawing 200 is colored individually for each region.

In the example of FIG. 6, the block drawing 400 is an image that is colored by setting the luminance of each color, red (R)/green (G)/blue (G), within a range of 0 to 255.

The region corresponding to the conference room A in the layout drawing 200 is colored in green (R, G, B)=(0, 255, 0).

The region corresponding to the conference room B in the layout drawing 200 is colored in blue (R, G, B) (0, 0, 255).

The region corresponding to the computer room in the layout drawing 200 is colored in red (R, G, B)=(255, 0, 0).

The region corresponding to the upper half of the room A in the layout drawing 200 is colored in magenta (R, G, B) (255, 0, 255).

The region corresponding to the lower half of the room A in the layout drawing 200 is colored in yellow (R, G, B)=(255, 255, 0).

The region corresponding to the corridor in the layout drawing 200 is colored in black (R, G, B)=(0, 0, 0).

The "block drawing 400" corresponds to the "range information" according to the present invention.

While Embodiment 1 is directed to the case of using the block drawing 400 as range information, the present invention is not limited to this. For example, the range of coordinates indicating each divided region, and information that identifies the region may be used as range information.

While in the example of FIG. 6 the layout drawing 200 is divided into rectangular regions corresponding to individual monitored spaces, the present invention is not limited to this. Each region may be a figure such as a curve or a circle, or may have a complex shape combining a plurality of figures. There may be a plurality of regions of the same color, or there may be portions that are not divided into blocks.

[Block Information 500]

FIG. 7 illustrates a data configuration of block identification information according to Embodiment 1.

The block information 500 is information that identifies each region into which the layout drawing 200 is divided.

As illustrated in FIG. 7, the block information 500 has block number, image color, and block type.

The block number is a unique number given individually to each color of an image of the block diagram 400. The block number is not limited to a number, but may be any information that identifies the color of each image, such as a symbol or a letter.

The image color is information indicating the color of an image of the block drawing 400 to which each block number is assigned. Herein, the image color is indicated by the luminance (0 to 255) of R, G, B.

The block type is information that identifies the monitored space corresponding to each region. The block type may be omitted in Embodiment 1.

A more detailed description will be given below with reference to the example of FIGS. 6, 7.

The image color of the block number "1" is "0, 255, 0". That is, the block number of the region colored in green (R, G, B)=(0, 255, 0) in the block drawing 400 in FIG. 6 is "1". The monitored space corresponding to this region is "conference room A".

Likewise, the block number of the region colored in magenta (R, G, B)=(255, 0, 255) in the block drawing 400 in FIG. 6 is "4", and the block number of the region colored in yellow (R, G, B)=(255, 255, 0) is "5". The monitored spaces corresponding to the magenta- and yellow-colored regions of the block drawing 400 are both "room A".

The "block number" corresponds to the "block identification information" according to the present invention.

In Embodiment 1, the correspondence between block types and block numbers, and regions in the layout drawing 200 is established by using the block information 500 that stated, for the block drawing 400 whose individual regions are distinguished by applying different colors, image colors applied to distinguish the individual regions, and block numbers corresponding to those colors. However, the present invention is not limited to this. For example, on the basis of information in which numbers and types are retained for individual regions for the block drawing 400 itself, block numbers and block types made to correspond to the regions may be identified. Also, the kind of a block may be automatically identified by the type of its image color (such that a red-based color indicates a room and a blue-based color indicates a passage). Also, a data sequence or the like including the range of coordinates indicating a region, and a block number and a block type corresponding to the region may be used.

Next, displaying of the layout drawing 200 that displays the installation position of each equipment device, and assigning of a block number to each equipment device will be described.

[Layout Drawing Display]

FIG. 8 illustrates a layout drawing screen according to Embodiment 1.

For example, displaying of a layout drawing is executed by the following procedure, upon activation of the management apparatus 100 or operation by a user.

(1) The controller 110 reads the layout drawing 200 stored in the storage device 150.

(2) The controller 110 refers to the positional information 300, and reads, for individual equipment device IDs, equipment icons (201 to 206) corresponding to equipment icon IDs (FIG. 8(a)).

(3) The controller 110 superimposes the read equipment icons on the corresponding coordinate positions in the layout drawing 200 on the basis of the coordinates X, Y of the positional information 300, and generates the layout drawing 200 that displays the installation position of each equipment device (FIG. 8(b)).

(4) The controller 110 causes the display device 140 to display the layout drawing 200 that displays the installation position of each equipment device.

In a case where there are a plurality of layout drawings 200, the user inputs an operation for selecting the layout drawing 200 to be displayed, and the above-mentioned operation is performed for the selected layout drawing 200. It is also possible to select a predetermined layout drawing 200 in advance.

By generating the layout drawing 200 in this way, for example, the layout drawing 200 can be easily modified even when the number of equipment devices increases or decreases or their positions are changed owing to repair work or the like.

While in this example the layout drawing 200 and an equipment icon indicating each equipment device are superimposed on each other, the present invention is not limited to this. It is also possible to use a drawing in which each equipment device is displayed in advance in a layout showing monitored spaces.

[Assignment of Block Numbers]

Figure 9:
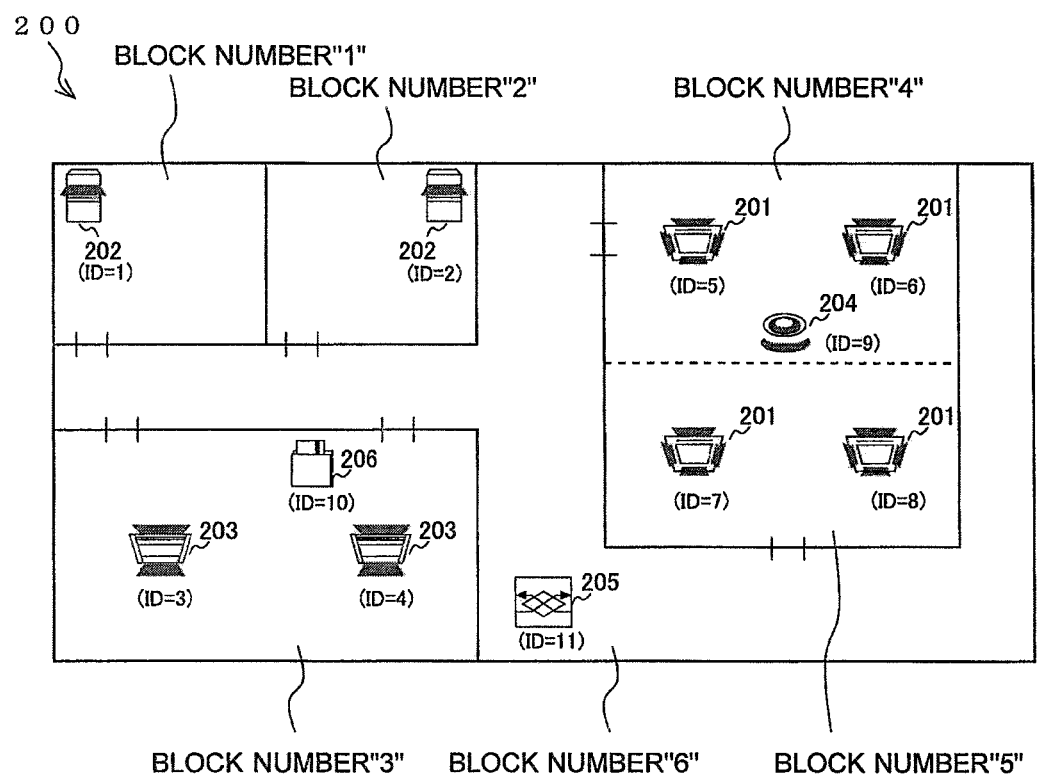
FIG. 9 illustrates assignment of block numbers according to Embodiment 1.

FIG. 9 illustrates assignment of block numbers according to Embodiment 1.

The controller 110 assigns each equipment device a block number for the region corresponding to its installation position, on the basis of the positional information 300 and the block information 500. Herein, assignment according to the image color of the layout drawing 400 will be described.

(1) The controller 110 reads the layout drawing 400 stored in the storage device 150.

(2) The controller 110 refers to the positional information 300, and acquires the coordinates X, Y corresponding to an equipment device ID.

(3) The controller 110 obtains an image color in the layout drawing 400 corresponding to the installation position of the equipment device ID, on the basis of the acquired coordinates X, Y.

(4) The controller 110 refers to the block information 500, and assigns a block number corresponding to the image color obtained in the step (3) above, to the equipment device ID (FIG. 9). At this time, information on block type may be assigned to the equipment device ID.

(5) The above-mentioned steps (1) to (4) are sequentially performed for all of equipment device IDs.

Further, a more specific description will be given below with reference to the example of FIGS. 6, 7.

First, the controller 110 refers to the positional information 300 (FIG. 3), and acquires the coordinates (200, 200) of the equipment device ID "1".

Next, the controller 110 obtains the image color "green (0, 255, 0)" at the coordinates (200, 200) in the layout drawing 400.

The controller 110 assigns the block number "1" for which the image color in the block information 500 is green (0, 255, 0), to the equipment device ID "1".

Through the same operation, the block number "2" is assigned to the equipment device ID "2".

The block number "3" is assigned to the equipment device ID "3".

The block number "3" is assigned to the equipment device ID "4".

The block number "4" is assigned to the equipment device ID "5".

The block number "4" is assigned to the equipment device ID "6".

The block number "5" is assigned to the equipment device ID "7".

The block number "5" is assigned to the equipment device ID "8".

The block number "4" is assigned to the equipment device ID "9".

The block number "3" is assigned to the equipment device ID "10".

The block number "6" is assigned to the equipment device ID "11".

In this way, according to Embodiment 1, each equipment device can be assigned a block number corresponding to the region of the installation position of the equipment device. That is, the same block number can be assigned to those equipment devices which are arranged in the same region, without individually setting/inputting block numbers for each equipment device, for example.

Since the block drawing 400 is divided into regions for at least each monitored space, the correspondence between each equipment device arranged in individual monitored spaces and its block numbers can be easily established.

Since the block drawing 400 is information on an image in which the layout drawing 200 is colored individually for each region, how regions are divided can be easily recognized visually. Moreover, when the user creates range information indicating the range of each region, the user can easily grasp the correspondence between the monitored space and each region, thereby improving convenience.

Since automatic block division can be performed on the basis of positional information and block information on each equipment device, natural block division using the layout drawing 200 can be advantageously performed by simply arranging each equipment device in position.

Further, the operational status of each equipment device can be displayed in the layout drawing 200 from the block information indicating a room, a passage, or the like. Therefore, it is possible for the user (equipment device manager or equipment device user) to grasp the present status of the equipment device more easily and more accurately than conventionally possible.

[Monitoring/Control]

Next, an example of how to monitor the status of and control operation of each equipment device by using the block number mentioned above will be described.

(Display of Equipment Apparatus Status)

Figures 10, 11:
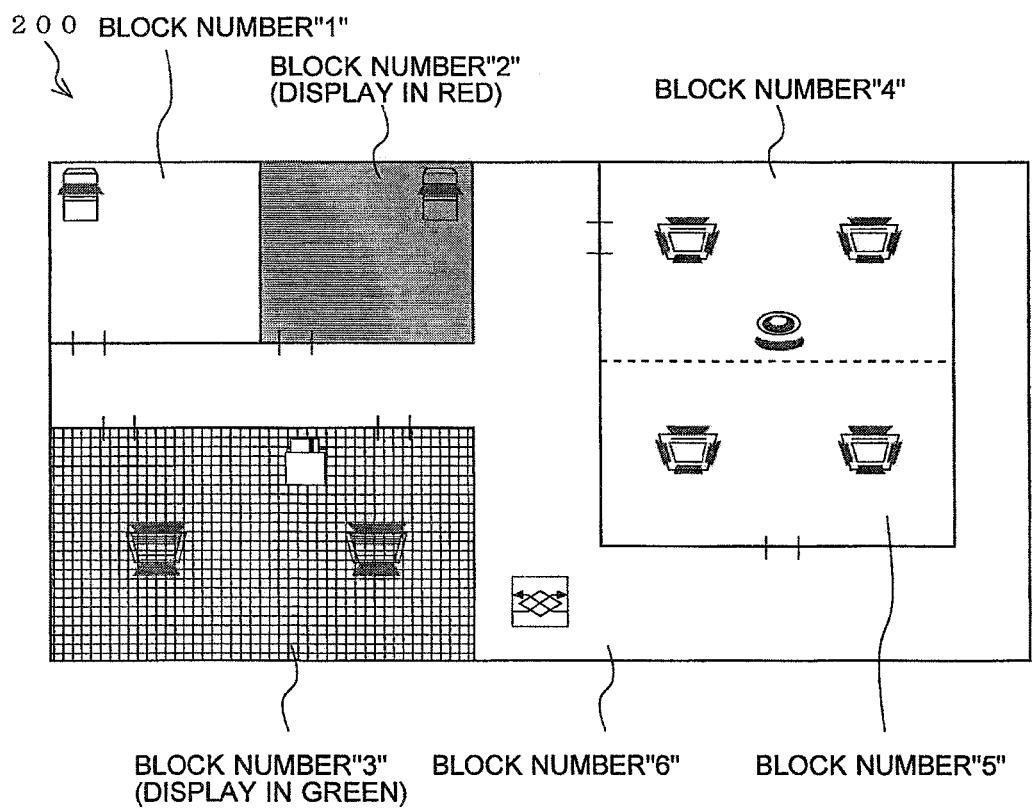
FIG. 10 illustrates an example of status monitoring results according to Embodiment 1.
FIG. 11 illustrates an example of status monitoring results according to Embodiment 1.

FIGS. 10 and 11 each illustrate an example of status monitoring results according to Embodiment 1.

For example, for each set of air-conditioning units 10 that are assigned the same block number, the controller 110 detects whether the status is run or stop, and whether the operation mode is heating or cooling, on the basis of status data acquired by the communication device 160.

Then, the controller 110 causes information on the detection results, or a color corresponding to the detection results, to be displayed in a region corresponding to the block number within the layout drawing 200.

For example, in a case where all the air-conditioning units 10 with the same block number are in stop status, the color of the region corresponding to the installation positions of the air-conditioning units 10 is displayed in black.

In a case where at least one of the air-conditioning units 10 with the same block number is in a cooling operation mode and in run status, the region corresponding to the installation position of the air-conditioning unit 10 is displayed in green.

In a case where at least one of the air-conditioning units 10 with the same block number is in a heating operation mode and in run status, the region corresponding to the installation position of the air-conditioning unit 10 is displayed in orange.

In a case where cooling and heating are mixed for the air-conditioning units 10 with the same block number, the corresponding region is displayed in red as a warning display.

In the example of FIG. 10, the information that both of the air-conditioning units 10 (ID3, ID4) that are assigned the same block number "3" are in the cooling operation is acquired from status data, and the region corresponding to the block number "3" is displayed in green.

By displaying the color of each region on the basis of status data in this way, the operational status of the entire monitored space can be recognized at a glance by the color. Therefore, the user can easily recognize whether the present operational status is a desired one or not, and it is also possible to prevent the user from forgetting turning off an air-conditioning unit, or the like.

FIG. 11 illustrates an example in which display of equipment icons is changed in accordance with the ON/OFF status of operation, as information on detection results detected from status data.

By changing display of equipment icons on the basis of status data in this way, operational status can be easily recognized visually.

(Display of Abnormality in Equipment Apparatus)

The controller 110 detects the presence/absence of an abnormality on the basis of status data, for each set of air-conditioning units 10 that are assigned the same block number. Then, the controller 110 causes information on the detection results, or a color corresponding to the detection results, to be displayed in a region corresponding to the block number within the layout drawing 200.

For example, in a case where the presence of an abnormality is detected for at least one of the air-conditioning units 10 that are assigned the same block number, the region corresponding to the installation position of the air-conditioning unit 10 is displayed in red.

In the example of FIG. 10, the information that the air-conditioning unit 10 (ID: 2) that is assigned the block number "2" is in abnormal status is acquired from status data, and the region corresponding to the block number "2" is displayed in red.

The color to be displayed may be changed in accordance with the number of equipment devices in which an abnormality is occurring, or the kind (significance) of the abnormality. Also, the display color may be made to flash on and off.

By displaying the color of each region on the basis of status data in this way, it is possible to recognize, at a glance, in which region of which monitored space an abnormality is occurring. Therefore, the user can easily recognize abnormal status.

FIG. 11 illustrates an example in which display of equipment icons is changed in accordance with the presence/absence of an abnormality, as information on the detection results detected from status data.

By changing display of equipment icons on the basis of status data in this way, abnormal status can be easily recognized visually.

(Group Control)

The controller 110 recognizes equipment devices that are assigned the same block number as one group, and controls operation individually for each block number.

For example, the controller 110 causes a plurality of air-conditioning units 10 that are assigned the same block number to operate or stop at once. Also, for a plurality of air-conditioning units 10 that are assigned the same block number, the controller 110 performs a rotation control that decreases their operation capacity or stops their operation in turn.

In this way, by handling equipment devices that are assigned the same block number as one group, a group setting operation becomes unnecessary, thereby improving convenience.

Moreover, because block numbers correspond to regions divided for at least each monitored space, correspondence can be easily established between the range of the monitored space and equipment devices to be set as a group.

Embodiment 2.

In Embodiment 2, on the basis of status data from each air-conditioning unit 10, a display indicating the reaching range of air blown from the air-conditioning unit 10 that is running is displayed only within the region of the installation position of the air-conditioning unit 10, and within the region with the same block type information.

The configuration according to Embodiment 2 is the same as in Embodiment 1 mentioned above, and the same portions are denoted by the same reference signs.

[Capacity Information 600]

FIG. 12 illustrates a data configuration of capacity information according to Embodiment 2.

In the storage device 150 according to Embodiment 2, capacity information 600 on each air-conditioning unit 10 is stored in advance.

The capacity information 600 has equipment device ID, installation angle, horizontal airflow direction range angle, the number of outlets, outlet direction, and maximum airflow reaching distance.

The installation angle is an installation angle with reference to a given air outlet of the air-conditioning unit 10. For example, the X-axis of the layout drawing 200 is taken as 0 degrees. The example of FIG. 12 indicates that the air-conditioning unit 10 with the equipment device ID "1" is installed so that its air outlet is directed at "315 degrees". This information on the installation angle may be omitted.

The horizontal airflow direction range angle indicates the range in the horizontal direction reached by air blown from one air outlet of the air-conditioning unit 10.

The number of outlets indicates the number of air outlets provided in the air-conditioning unit 10.

The outlet direction indicates the direction of the air outlet (angle in the horizontal direction) in the layout drawing 200. For example, one given outlet is taken as a reference. For example, in a case where the number of outlets is "two directions", one outlet is taken as a reference "0 degrees", and the angle in the horizontal direction of the other outlet relative to this reference is indicated. The example of FIG. 12 indicates that for the air-conditioning unit 10 with the equipment device ID "3", when one of the outlets in two directions is taken as "0 degrees", the direction of the other outlet is "180 degrees".

The maximum airflow reaching distance indicates the maximum value of the distance reached by air blown from the air outlet of the air-conditioning unit 10.

[Status Data 700]

FIG. 13 illustrates a data configuration of status data according to Embodiment 2.

In Embodiment 2, each air-conditioning unit 10 transmits status data 700 to the management apparatus 100.

The status data 700 has equipment device ID, run/stop, operation mode, airflow direction setting, and airflow velocity setting.

The run/stop indicates whether the air-conditioning unit 10 is running or being stopped.

The operation mode indicates which mode such as heating, cooling, or ventilation the air-conditioning unit 10 is in.

The airflow direction setting indicates the direction of air blown from the air outlet with respect to the vertical direction. For example, the horizontal direction is defined as an angle of 0 degrees, and the vertical downward direction is defined as an angle of 90 degrees. In the example of FIG. 13, in a case where the airflow direction setting is "diagonal 1", this indicates that the airflow direction is at an angle of 60 degrees downward with respect to the horizontal direction. For example, in the case of "diagonal 2", this indicates that the airflow direction is at an angle of 90 degrees downward with respect to the horizontal direction. Also, "swing" indicates swing motion within a predetermined angle range.

The airflow velocity setting is information indicating the airflow velocity of air blown from the air outlet. For example, with the maximum airflow velocity setting as 4, the airflow velocity is set in quarters of this value. In the example of FIG. 13, an airflow velocity setting "4" indicates the maximum airflow velocity setting, and "2" indicates an airflow velocity that is 50% of the maximum airflow velocity.

[Display of Airflow Reaching Range]

Figure 14:
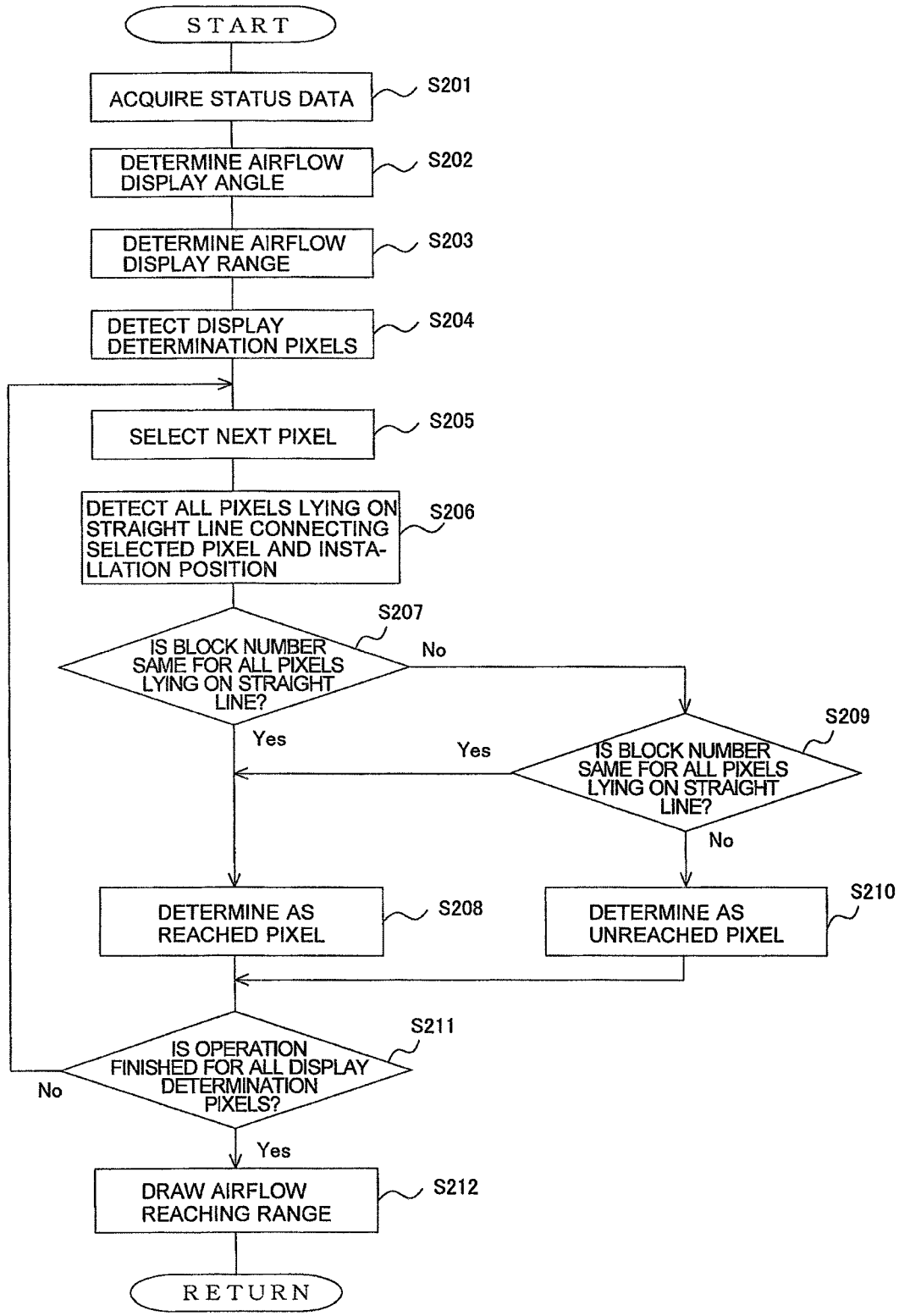
FIG. 14 is a flowchart illustrating displaying of an airflow reaching range according to Embodiment 2.

FIG. 14 is a flowchart illustrating displaying of an airflow reaching range according to Embodiment 2.

FIGS. 15 to 18 each explain displaying of an airflow reaching range according to Embodiment 2.

The controller 110 in Embodiment 2 performs displaying of an airflow reaching range after the assignment of block numbers described with reference to Embodiment 1 mentioned above.

Hereinafter, the display operation will be described with reference to FIGS. 15 to 18 on the basis of each step in FIG. 14.

(S201)

The communication device 160 acquires the status data 700 from each air-conditioning unit 10, and inputs the status data 700 to the controller 110.

(S202)

The controller 110 determines an airflow display angle on the basis of the capacity information 600.

This will be described more specifically below, with the X-axis of the layout drawing 200 being taken as an angle of 0 degrees.

In the example of the capacity information 600 in FIG. 12, for the air-conditioning unit 10 whose equipment device ID is "3", the horizontal direction range angle is "60 degrees", the number of outlets is "two directions", and the outlet direction is "0 degrees, 180 degrees".

From these pieces of information, as illustrated in FIG. 15(*a*), a range of 60 degrees (+30 degrees to −30 degrees) with reference to the angle of 0 degrees, and a range of 60 degrees (150 degrees to 210 degrees) with reference to the angle of 180 degrees are each determined as the airflow display angle.

That is, the airflow display angle indicates the range of airflow that spreads in the horizontal direction from the air-conditioning unit 10.

(S203)

Next, the controller 110 determines an airflow display range on the basis of the capacity information 600, the status data 700, and information on the distance in the monitored space per pixel of the layout drawing 200.

The information on the distance in the monitored space per pixel of the layout drawing 200 may be stored in the storage device 150 in advance, or may be input from the input device 130.

Herein, the distance in the monitored space per pixel of the layout drawing 200 is set as 0.01 [m]. The horizontal direction is defined as an angle of 0 degrees, and the vertical downward direction is defined as an angle of 90 degrees. A more specific description will be given below.

In the example of the status data 700 in FIG. 13, the operation of the air-conditioning unit 10 with the equipment device ID "3" is such that the airflow direction setting is "diagonal 1" at an angle of 60 degrees, and the airflow velocity setting is "2" that is 50% of the maximum airflow velocity. Also, the maximum airflow reaching distance for the equipment device ID "3" is "2.0 m".

From these pieces of information, as illustrated in FIG. 15(b), the airflow display range is determined by the following computational expression.

Maximum airflow reaching distance×airflow velocity setting×|cos(airflow direction setting)|+distance per pixel In the case of the above-mentioned example, a range of radius 2.0 m×50%×0.5÷0.01 m=75 [pixels] from the center of the equipment device ID "3" is determined as the airflow display range.
(S204)

The controller 110 detects pixels in the layout drawing 200 which are included within the range of the airflow display angle, and within the airflow display range as display determination pixels 210.

That is, the display determination pixels 210 represent the reaching range of air blown from the air-conditioning unit 10 in the layout drawing 200.

This reaching range is determined from the capacity and the present operational status of the air-conditioning unit 10, irrespective of the installation position of the air-conditioning unit 10. That is, in a case where different monitored spaces such as the corridor and the room A are included in the reaching range, the reaching range includes even a range not actually reached by an airflow as the airflow is blocked by a wall or the like.

For this reason, the range not reached by the airflow is determined by using information on block number and block type.
(S205)

The controller 110 selects the next pixel from among the display determination pixels 210. When executing this process for the first time, the controller 110 selects a predetermined pixel, such as a pixel with the largest coordinate value, from among the display determination pixels 210.
(S206)

The controller 110 detects all pixels lying on the straight line connecting the coordinates of the selected pixel, and the coordinates of the installation position of an equipment device.
(S207)

The controller 110 determines whether or not all the pixels on the straight line detected in step S206 are pixels lying within the same region as the block number assigned to the equipment device.

For example, the air-conditioning unit 10 with the equipment device ID "3" is assigned the block number "3". From the block drawing 400 and the block information 500, the image color "red" corresponding to the block number "3" is obtained, and it is determined whether or not all the pixels lying on the straight line detected in step S206 are included within the "red" region in the block drawing 400.
(S208)

In a case where all the pixels on the straight line are pixels lying within the same region as the block number assigned to the equipment device, the controller 110 determines that the pixel of the display determination pixels 210 selected in step S205 is a pixel (reached pixel) lying within a range actually reached by air blown from the air-conditioning unit 10.

In this way, in a case where all pixels lying on a straight line connecting one of the display determination pixels 210 and the installation position of an equipment device are within the same region, that is, within the same monitored space, it is determined that there is no obstruction such as a wall or a structure between this pixel and the equipment device, and the airflow reaches this pixel.
(S209)

In a case where, in step S207, not all the pixels on the straight line are pixels lying within the same region as the block number assigned to the equipment device, the controller 110 determines whether or not all the pixels on the straight line detected in step S206 are pixels lying within the same region as the block type assigned to the equipment device.

For example, the air-conditioning unit 10 with the equipment device ID "7" is assigned the block type "room A". From the block drawing 400 and the block information 500, the image colors "magenta" and "yellow" corresponding to the block type "room A" are obtained, and it is determined whether or not all the pixels on the straight line detected in step S206 are included within the "magenta" or "yellow" region in the block drawing 400.

In a case where all the pixels on the straight line are pixels lying with the same region as the block type assigned to the equipment device, the controller 110 proceeds to step S208, and determines that the pixel of the display determination pixels 210 selected in step S205 is a pixel (reached pixel) lying within a range actually reached by air blown from the air-conditioning unit 10.

In this way, in a case where all pixels lying on a straight line connecting one of the display determination pixels 210 and the installation position of an equipment device are of the same block type, that is, within the same monitored space, it is determined that there is no obstruction such as a wall or a structure between this pixel and the equipment device, and the airflow reaches this pixel.
(S210)

In a case where not all the pixels on the straight line are pixels lying within the same region as the block type assigned to the equipment device, the controller 110 determines that the pixel of the display determination pixels 210 selected in step S205 is a pixel (unreached pixel) lying within a range not actually reached by air blown from the air-conditioning unit 10.

In this way, in a case where there is even one pixel that differs in block number and also differs in block type among pixels lying on a straight line connecting a selected pixel and the installation position of an equipment device, it is determined that there is an obstruction such as a wall or a structure between this pixel and the equipment device, and the airflow does not reach this pixel.
(S211)

The controller 110 determines whether the operation is finished for all of the display determination pixels 210. If the operation is not finished for all of the display determination pixels 210, the controller 110 returns to step S205, selects the next pixel from among the display determination pixels 210, and repeats the above-mentioned operation.
(S212)

In a case where the operation is finished for all of the display determination pixels 210, for those of the display determination pixels 210 which are determined as reached pixels, the controller 110 causes the display device 140 to draw a display indicating the reaching range of air blown from the air-conditioning unit 10.

Figure 16:
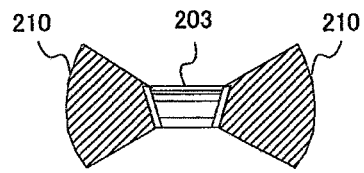
FIG. 16 explains displaying of an airflow reaching range according to Embodiment 2.

Through this operation, for example, because all of the display determination pixels 210 are within the region of the same block number for the air-conditioning unit 10 with the equipment device ID "3", as illustrated in FIG. 16, the airflow reaching range is displayed for all of the display determination pixels 210.

Figure 17:
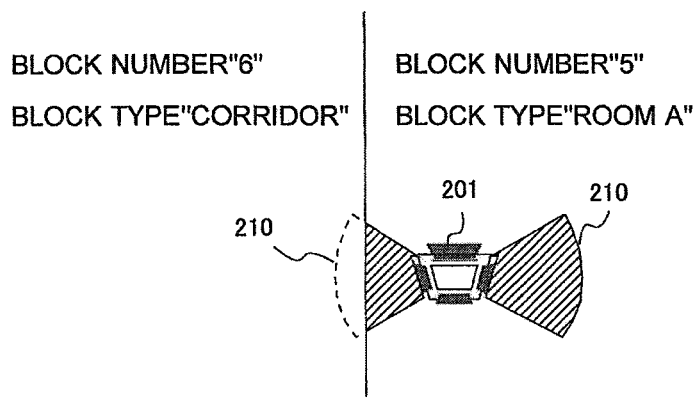
FIG. 17 explains displaying of an airflow reaching range according to Embodiment 2.

For example, for the air-conditioning unit 10 with the equipment device ID "7", with respect to the outlet direction of "180 degrees", some of the display determination pixels 210 differ in block number and also differ in block type. Therefore, as illustrated in FIG. 17, some of the display determination pixels 210 are determined as unreached pixels, and the airflow reaching range is displayed only within the range of the same block number.

Figure 18:
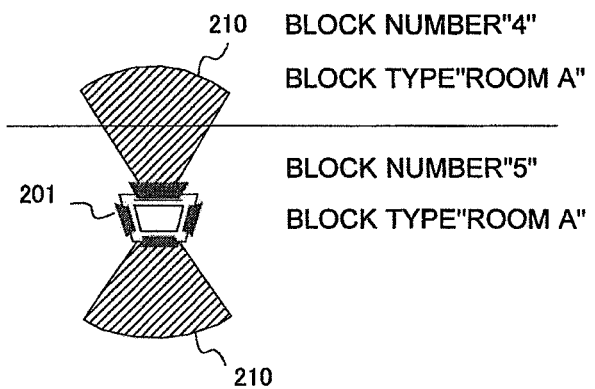
FIG. 18 explains displaying of an airflow reaching range according to Embodiment 2.

For example, for the air-conditioning unit 10 with the equipment device ID "7", with respect to the outlet direction of "90 degrees", some of the display determination pixels 210 differ in block number but are of the same block type. Therefore, as illustrated in FIG. 18, the airflow reaching range is displayed for all of the display determination pixels 210.

In this way, among the display determination pixels 210, the reaching range of air blown from the air-conditioning unit 10 can be displayed only for those pixels which lie within the region of the installation position of the air-conditioning unit 10, and within the region of the same block type.

Figure 19:
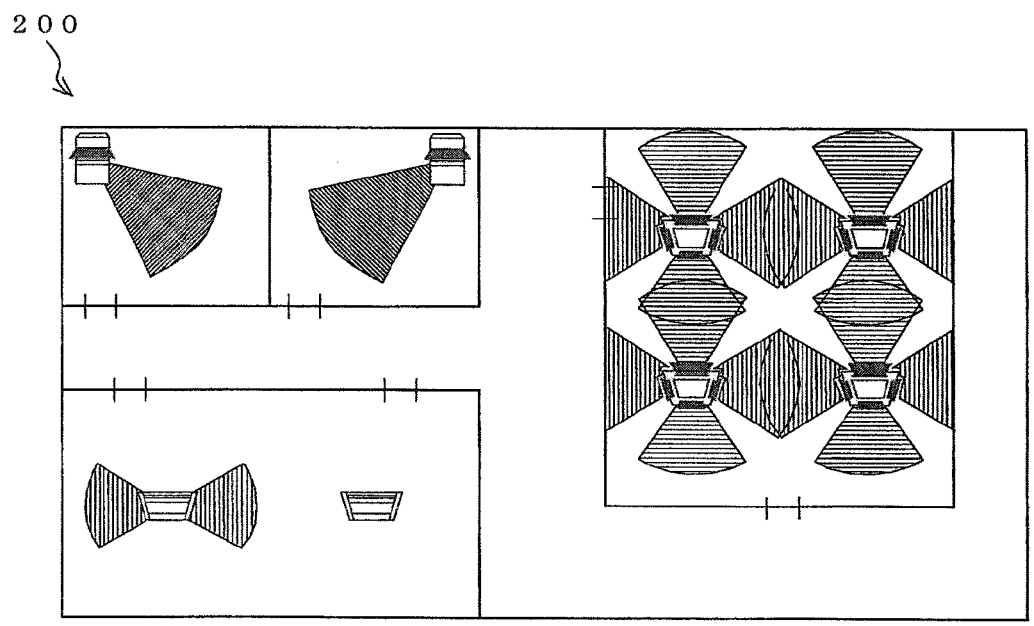
FIG. 19 explains displaying of an airflow reaching range according to Embodiment 2.

FIG. 19 explains airflow reaching ranges displayed according to Embodiment 2.

FIG. 19 illustrates airflow reaching ranges drawn by the above-mentioned operation, for the case of the capacity information 600 in FIG. 12 and the status data 700 in FIG. 13, for example.

In this way, on the basis of status data on the air-conditioning unit 10, a display within the layout drawing 200 which indicates the reaching range of air blown from the air-conditioning unit 10 that is running, is displayed only within the range of the installation position of the air-conditioning unit 10, and within the region of the same block type information. Therefore, the operational status of the air-conditioning unit 10 can be easily grasped visually. In addition, the range actually reached by the airflow from the air-conditioning unit 10 can be easily grasped. Consequently, the user can easily perform monitoring for excessive air conditioning or for lack of air conditioning, thereby improving convenience.

While in Embodiment 2 determination of a reached pixel is performed by using a straight line connecting the coordinates of each of the display determination pixels 210, and the coordinates at which an equipment device is installed, the present invention is not limited to this.

For example, determination of a reached pixel may be performed only by determining a match between an image color in the block drawing 400 corresponding to the coordinates of each of the display determination pixels 210, and an image color in the block drawing 400 corresponding to the coordinates of the installation position of the equipment device.

The display of the airflow reaching range mentioned above may be performed by performing a determination in real time when the operational status of the air-conditioning unit 10 changes. Alternatively, it is also possible to employ means such as performing a determination in advance at the time of the initial setting of an equipment device, accumulating data, and performing the display by using the accumulated data.

The display color of the airflow reaching range may be changed in accordance with the operation mode, or the display color of the airflow reaching range may be changed in accordance with whether the airflow velocity is strong or weak. Also, the display color may be changed in accordance with whether an equipment device and each of the display determination pixels 210 is far from or close to each other. Alternatively, it is also possible to employ means such as changing the display color in accordance with whether the set temperature is high or low.

The capacity information 600 on each equipment device, or the status data 700 may be automatically collected from each equipment device, or data on each equipment device may be input at the initial setting of the management apparatus 100. Alternatively, it is also possible to employ means such as reading table data to the management apparatus 100 from the outside.

[Control of Airflow Reaching Range]

On the basis of the above-mentioned airflow reaching ranges displayed, the controller 110 may control the air-conditioning unit 10 to reduce overlap of the airflow reaching ranges.

For example, in a case where displays indicating the reaching ranges of a plurality of air-conditioning units 10 overlap, the controller 110 reduces the overlap of the reaching ranges by controlling, for at least one of the plurality of air-conditioning units 10, at least one of the direction of blown air, airflow velocity, and stopping of operation.

FIG. 20 explains controlling of airflow reaching ranges according to Embodiment 2.

FIG. 20(*a*) illustrates an example of airflow reaching ranges drawn on the basis of the present status data 700.

FIG. 20(*b*) illustrates an example of airflow reaching ranges after control of the airflow reaching ranges.

As illustrated in FIG. 20(*a*), the respective airflow reaching ranges of the air-conditioning units 10 with the equipment device Ds "5" to "8" partially overlap. In a case where the controller 110 detects such an overlap, for example, the controller 110 reduces airflow velocity to reduce the airflow reaching range for the air-conditioning units 10 with the equipment device IDs "5" and "8". Consequently, as illustrated in FIG. 20(*b*), the overlap of airflow reaching ranges is reduced.

By performing such an operation automatically by the controller 110, it is possible to prevent excessive air conditioning with overlapping airflow reaching ranges. Moreover, the user does not need to perform operation settings of the air-conditioning unit 10, or the like, thereby improving convenience.

While Embodiment 2 is directed to the case of displaying and controlling the airflow reaching range of the air-conditioning unit 10, the present invention is not limited to this. For example, a display according to the actual operational status may be performed for the lighting unit 20 or the ventilation unit 40 as well.

For example, in the case of the lighting unit 20, information such as the range of brightness equal to or higher than a predetermined illuminance, and directivity is stored as the capacity information 600, and information such as ON/OFF of lighting, and illuminance settings is obtained as the status data 700. Then, by defining a range for which a predetermined brightness can be obtained as a light reaching range, in the same manner as in the above-mentioned operation, a display of the light reaching range may be drawn only within the region of the same block number, and within the region of the same block type.

For example, in the case of the ventilation unit 40, information such as air exchange capacity and its range is stored as the capacity information 600, and information such as ON/OFF and operation intensity settings is obtained as the status data 700. Then, by defining a range for which ventilation of air is possible as a ventilation range, in the same manner as in the above-mentioned operation, a display of the ventilation range may be drawn only within the region of the same block number, and within the region of the same block type.

Embodiment 3.

In Embodiment 3, an example of how the status of each equipment device is monitored by using a block number assigned to each equipment device by the operation in Embodiment 1 mentioned above will be described.

The configuration in Embodiment 3 is the same as in Embodiment 1 mentioned above, and the same portions are denoted by the same reference signs.

The storage device 150 in Embodiment 3 includes, as the block type of the block information 500, information indicating whether or not a temperature rise is allowed for the monitored space.

For example, in the example of FIG. 7, the block identification "computer room" indicates a space for which a temperature rise is not allowed.

In this way, the block type according to Embodiment 3 is information that identifies the monitored space corresponding to each region, and also indicates whether or not a temperature rise is allowed for the monitored space.

The controller 110 detects the air-conditioning unit(s) 10 installed in the monitored space for which a temperature rise is not allowed, on the basis of the block type of the block information 500, and the block number.

For example, in the example of FIG. 7, the block number of the block type "computer room" is "3". Consequently, the controller 110 detects the air-conditioning units 10 with the equipment device IDs "3" and "4" that are assigned the block number "3".

In a case where the controller 110 detects from the status data 700 that the detected air-conditioning unit 10 is in stop status or in an operation mode other than cooling, the controller 110 causes warning information, or a predetermined color corresponding to a warning, to be displayed in the corresponding monitored space within the layout drawing 200.

For example, in a case where stop status, or an operation mode other than cooling is detected for at least one of the air-conditioning units 10 with the equipment device IDs "3" and "4", the region corresponding to the block number "3" is displayed in red.

While in the above-mentioned operation a warning is displayed in the case where stop status or an operation mode other than cooling is detected, a warning may be displayed on the basis of temperature.

In this case, as the status data 700, each air-conditioning unit 10 transmits information on the temperature within the monitored space that is to be air-conditioned. On the basis of the status data 700, the controller 110 detects the temperature within the monitored space for which a temperature rise is not allowed, and in a case where the detected temperature is higher than a predetermined value, the controller 110 causes warning information, or a predetermined color corresponding to a warning, to be displayed in the corresponding monitored space within the layout drawing 200.

In this way, a space for which a temperature rise is not allowed is identified, and the color of each region is displayed on the basis of status data. Therefore, the user can easily recognize that the present operational status is one that can lead to a temperature rise. Because a warning is displayed for those regions in which a temperature rise can occur, the user can recognize, at a glance, for which region in which monitored space a temperature rise is not allowed. Therefore, convenience can be improved.

While the above description is directed to the case where the monitored space for which a temperature rise is not allowed is "computer room", for example, a space such as "food warehouse" where the temperature needs to be maintained at a predetermined temperature or less can be set as appropriate.

Embodiment 4.

In Embodiment 4, an example of how the status of each equipment device is monitored by using a block number assigned to each equipment device by the operation in Embodiment 1 mentioned above will be described.

The configuration in Embodiment 4 is the same as in Embodiment 1 mentioned above, and the same portions are denoted by the same reference signs.

Each equipment device in Embodiment 4 transmits information on the present power consumption as the status data 700. The controller 110 computes, for each set of equipment devices that are assigned the same block number, the sum of instantaneous power, the sum of power consumption over a predetermined period, or power consumption per unit area of a region corresponding to the block number, on the basis of the status data 700.

Then, the controller 110 causes information on the computed value, or a color corresponding to the computed value, to be displayed in a region corresponding to the block information 500 within the layout drawing 200.

As for the power consumption per unit area, for example, the area of the corresponding region is determined from the distance in the monitored space per pixel of the layout drawing 200 described above with reference to Embodiment 2. Then, the power consumption per unit area can be determined by dividing the sum of the power consumption of equipment devices within this region by the area of the region.

While the above-mentioned operation is directed to the case of displaying information on the computed value or a color corresponding to the computed value, this display may be performed only in a case where the computed value exceeds a predetermined value.

In this case, the controller 110 computes, for each set of equipment devices that are assigned the same block information 500, the sum of instantaneous power, the sum of power consumption over a predetermined period, or power consumption per unit area of a region corresponding to the block information 500, on the basis of the status data, and in a case where the computed value exceeds a predetermined value, the controller 110 causes information on the computed value, or a predetermined color to be displayed in a region corresponding to the block information 500 within the layout drawing 200.

The controller 110 computes, for each set of equipment devices that are assigned the same block information 500, the sum of instantaneous power, the sum of power consumption over a predetermined period, or power consumption per unit area of a region corresponding to the block number, on the basis of the status data 700, and periodically stores this computed values. Then, the controller 110 may determine the increase/decrease value of the computed value that is presently computed with respect to the stored computed values, and cause increase/decrease value information, or a color corresponding to the increase/decrease value, to be displayed in a region corresponding to the block information 500 within the layout drawing 200.

For example, the computed value stored the previous day and the presently computed value are compared with each other to determine by how much percent the power consumption has increased (or decreased) from the previous day, and a color corresponding to this increase/decrease value is displayed.

In this way, by acquiring information on the present power consumption from each equipment device, and displaying the color of each region on the basis of this power consumption, the power being consumed in each monitored space can be easily grasped visually. Therefore, the user can easily recognize how much power is being consumed for each monitored space. Moreover, the user can easily perform monitoring for any excessive power consumption, thereby improving convenience.

Embodiment 5.

In Embodiment 5, an example of how the status of each equipment device is monitored by using a block number assigned to each equipment device by the operation in Embodiment 1 mentioned above will be described.

The configuration in Embodiment 5 is the same as in Embodiment 1 mentioned above, and the same portions are denoted by the same reference signs.

The air-conditioning unit 10 in Embodiment 5 transmits, as the status data 700, information on the installation temperature set for the air-conditioning unit 10, and information on the temperature (indoor temperature) within the monitored space that is to be air-conditioned.

The controller 110 computes, for each set of air-conditioning units 10 that are assigned the same block number, the average value of the differences between set temperatures set for individual air-conditioning units 10 and the temperature within the monitored space, on the basis of the status data 700.

Then, the controller 110 causes information on the computed value, or a color corresponding to the computed value, to be displayed in a region corresponding to the block number within the layout drawing 200. For example, the display is performed in such a way that the intensity of the tone of a red-based color is increased as the temperature difference becomes greater.

While the temperature difference between the set temperature and the indoor temperature is computed in the above-mentioned case, the present invention is not limited to this.

For example, each air-conditioning unit 10 transmits, as the status data 700, information on the set temperature set for the air-conditioning unit 10, and information on the outside air temperature (the temperature outside the monitored space).

The controller 110 computes, for each set of air-conditioning units 10 that are assigned the same block number, the average value of the differences between set temperatures set for individual air-conditioning units 10 and the outside air temperature, on the basis of the status data 700.

Then, the controller 110 causes information on the computed value, or a color corresponding to the computed value, to be displayed in a region corresponding to the block number within the layout drawing 200.

Also, for example, a setting of target set temperature is input for each monitored space from the input device 130.

The controller 110 computes, for each set of air-conditioning units 10 that are assigned the same block number, the average value of the differences between set temperatures set for individual air-conditioning units 10, and the target set temperature set for each monitored space, on the basis of the status data 700.

Then, the controller 110 causes information on the computed value, or a color corresponding to the computed value, to be displayed in a region corresponding to the block number within the layout drawing 200.

In this way, by acquiring information related to temperature from each air-conditioning unit 10, and displaying the color of each region on the basis of this temperature, the state of the temperature in each monitored space can be easily grasped visually.

Moreover, it is possible to easily recognize a region where the set temperature is inappropriate, such as when the set temperature is unnecessarily high (low).

Moreover, the temperature difference between the target set temperature set for the management apparatus 100, and the set temperature individually set in each air-conditioning unit 10 can be recognized visually. Therefore, it is possible to easily recognize those air-conditioning units 10 which are not set as intended by the user (manager) of the management apparatus 100.

Consequently, the user can easily perform monitoring for excessive air conditioning or for lack of air conditioning, thereby improving convenience.

Embodiment 6.

In Embodiment 6, an example of how operation of each equipment device is controlled by using a block number assigned to each equipment device by the operation in Embodiment 1 mentioned above will be described.

The configuration in Embodiment 6 is the same as in Embodiment 1 mentioned above, and the same portions are denoted by the same reference signs.

[Interlock Control]

FIG. 21 illustrates a data configuration of interlock setting information according to Embodiment 6.

The storage device 150 in Embodiment 6 stores interlock setting information 800.

As illustrated in FIG. 21, the interlock setting information 800 has interlock condition, interlock source device, interlock target device, and interlock operation.

The interlock condition represents a condition for performing interlock control.

The interlock source device represents an equipment device for which the interlock condition is set.

The interlock target device represents an equipment device that is subject to interlock control.

The interlock operation represents information for operating the interlock target device when the interlock source device satisfies the interlock condition.

For example, the example of FIG. 21 indicates that in a case where the interlock source device is "lighting unit", and the interlock condition is "OFF", when the lighting unit is in OFF status, the interlock target device "air-conditioning unit" is "stopped" as the interlock operation.

The controller 110 constantly or periodically acquires the status data 700 from each equipment device, and refers to the interlock setting information 800 mentioned above.

Then, when the interlock source device satisfies the interlock condition, the controller 110 causes the interlock target device that is assigned the same block number as the interlock source device to operate in accordance with information on the interlock operation.

Here, an interlock operation according to the interlock setting information 800 in FIG. 21 will be described specifically, by way of an example in which block numbers as illustrated in FIG. 9 are assigned to individual equipment devices as a result of the operation according to Embodiment 1 mentioned above.

(1) In a case where the card key 30 with the equipment device ID "10" becomes ON, the controller 110 determines that the interlock condition "ON" for the interlock source device "card key" is satisfied.

(2) The block number "3" assigned to the equipment device that satisfies the interlock condition is detected.

(3) It is determined whether or not the interlock target device "air-conditioning unit" or "lighting unit" exists among equipment devices that are assigned the block number "3". Since the equipment device IDs "3" and "4" are the air-conditioning units 10, it is determined that the interlock target device "air-conditioning unit" exists.

(4) The controller 110 causes the air-conditioning units 10 with the equipment device IDs "3" and "4" that are assigned the block number "3" to perform the operation "run" as the interlock operation.

In this way, in accordance with the interlock setting information 800, interlocked control can be performed for a plurality of equipment devices that are assigned the same block number. For example, each equipment device can be operated appropriately in accordance with the usage condition, such as running the air-conditioning unit 10 during ON status of a lighting unit or ON status of a card key when it is assumed that the corresponding monitored space is being used, or stopping the air-conditioning unit 10 during OFF status of a lighting unit or OFF status of a card key when it is assumed that the monitored space is not being used.

Moreover, by stopping operation of the air-conditioning unit 10 or the like in a case where it is assumed that the monitored space is not being used, unnecessary air conditioning can be reduced.

Embodiment 7

In Embodiment 7, an example of how operation of each equipment device is controlled by using a block number assigned to each equipment device by the operation in Embodiment 1 mentioned above will be described.

The configuration in Embodiment 7 is the same as in Embodiment 1 mentioned above, and the same portions are denoted by the same reference signs.

The controller 110 in Embodiment 7 determines the plane area of a monitored space, on the basis of information on the distance in the monitored space per pixel of the layout drawing 200.

Then, the controller 110 controls the airflow velocity of air blown by the air-conditioning unit 10, in accordance with the plane area of the monitored space corresponding to the installation position of the air-conditioning unit 10.

The information on the distance in the monitored space per pixel of the layout drawing 200 may be stored in the storage device 150 in advance, or may be input from the input device 130.

For example, the distance in the monitored space per pixel of the layout drawing 200 is set as 0.01 [m]. Then, the plane area is determined from the range of each monitored space in the layout drawing 200.

The controller 110 controls each air-conditioning unit 10 so that the airflow velocity setting of the air-conditioning unit 10 becomes greater as the plane area becomes larger.

This airflow velocity setting may be determined from, for example, table information or the like in which area and the capacity of the air-conditioning unit are associated with each other.

Through the operation mentioned above, the operation of the air-conditioning unit 10 can be controlled in accordance with the size of the monitored space, thereby enabling appropriate air-conditioning control suited to the size of the space. Therefore, it is possible to obtain a certain level of comfort for each monitored space.

Embodiment 8.

In Embodiment 8, an example of how operation of each equipment device is controlled by using a block number assigned to each equipment device by the operation in Embodiment 1 mentioned above will be described.

The configuration in Embodiment 8 is the same as in Embodiment 1 mentioned above, and the same portions are denoted by the same reference signs.

[Schedule Control]

FIG. 22 illustrates a data configuration of schedule setting information according to Embodiment 8.

The storage device 150 according to Embodiment 8 stores schedule setting information 900.

As illustrated in FIG. 22, the schedule setting information 900 has information on use/non-use for each block type and time.

The block type is information that identifies the monitored space corresponding to each region. This block type corresponds to the block type of the block information 500.

Information on use/non-use is information that identifies whether the monitored space is used or not according to at least one of time, date, or day of week, for each block type.

For example, as illustrated in FIG. 22, for each time, use is identified by "O", and non-use is identified by "-".

The schedule setting information 900 may be input by the user with the input device 130 or the like, for example, or may be input from a remote control or the like provided to an equipment device and acquired by the management apparatus 100 via the communication device 160.

Here, an interlock operation according to the schedule setting information 900 in FIG. 22 will be described specifically, by way of an example in which block numbers as illustrated in FIG. 9 are assigned to individual equipment devices as a result of the operation according to Embodiment 1 mentioned above.

(1) The controller 110 constantly or periodically detects the present time. In a case where the present time is seven o'clock, the controller 110 refers to use/non-use for the time "7" of the schedule setting information 900, and obtains information that the block types "conference room A", "conference room B", and "room A" are not being used, and the block type "computer room" is being used.

(2) The controller 110 detects block numbers corresponding to block types that are not being used. In this example, these block numbers are "1", "2", "4", and "5".

(3) The controller 110 causes the operations of all equipment devices that are assigned the block numbers "1", "2", "4", and "5" to stop (OFF).

Through this operation, the operation of each equipment device installed in an unused monitored space can be stopped on the basis of the schedule setting information 900.

Because operation can be stopped automatically in accordance with the usage condition of the monitored space, each equipment device can be operated appropriately in accordance with the usage condition.

By stopping operation of the air-conditioning unit 10 or the like in a case where the monitored space is not being used, unnecessary air conditioning can be reduced.

Embodiment 9.

In Embodiment 9, an example of how operation of each equipment device is controlled by using a block number assigned to each equipment device by the operation in Embodiment 1 mentioned above will be described.

The configuration in Embodiment 9 is the same as in Embodiment 1 mentioned above, and the same portions are denoted by the same reference signs.

The controller 110 in Embodiment 9 computes, for each set of air-conditioning units 10 that are assigned the same block number, the average value of the differences between set temperatures set for individual air-conditioning units 10 and the outside air temperature, on the basis of the status data 700.

Then, the controller 110 sets the set temperatures of the individual air-conditioning units 10 so that the computed value becomes smaller than a predetermined value.

Through this operation, for example, for each air-conditioning unit 10 to which a block number corresponding to the block type "corridor" is assigned, the difference between the set temperature and the outside air temperature can be made smaller. Consequently, it is possible to reduce a heat shock applied to the human body owing to the temperature difference between the indoor temperature and the outside air temperature.

REFERENCE SIGNS LIST

10 air-conditioning unit, 20 lighting unit, 30 card key, 40 ventilation unit, 100 management apparatus, 101 air-conditioning-unit controller, 102 general-purpose controller, 110 controller, 130 input device, 140 display device, 150 storage device, 160 communication device, 200 layout drawing, 201 air-conditioning unit A display, 202 air-conditioning unit B display, 203 air-conditioning unit C display, 204 lighting unit display, 205 ventilation unit display, 206 card key display, 210 display determination pixel, 300 positional information, 400 block drawing, 500 block information, 600 capacity information, 700 status data, 800 interlock setting information, 900 schedule setting information.

The invention claimed is:

1. A management apparatus for an air-conditioning system, which monitors status of and controls operations of a plurality of equipment devices including at least an air-conditioning unit, comprising:
    a storage device configured to store information on a layout drawing indicating a layout of one or a plurality of monitored spaces, positional information indicating an installation position of each of the equipment devices in the layout drawing, and block information having range information and block identification information, the range information dividing the layout drawing into regions for at least each of the monitored spaces and indicating a range of each of the regions, the block identification information identifying each of the regions;
    a display device; and
    a controller configured to
        cause the display device to display the layout drawing that displays an installation position of each of the equipment devices, on a basis of the information on the layout drawing and the positional information,
        assign, to each of the equipment devices, the block identification information for the region corresponding to the installation position, on a basis of the positional information and the block information, and
        divide the plurality of equipment devices for each piece of the block identification information, and perform at least one of monitoring of status and control of an operation,
    wherein:
        the range information of the block information is information on an image in which the layout drawing is colored for each of the regions;
        the block identification information of the block information is given for each color of the image; and
        the controller assigns, to each of the equipment devices, the block identification information corresponding to a color of an installation position in the image.

2. The management apparatus for an air-conditioning system of claim 1,
    wherein:
        the storage device stores a plurality of pieces of the block information for a single piece of the information on the layout drawing; and
        the controller selects one of the plurality of pieces of block information, and assigns, to each of the equipment devices, the block identification information for the region corresponding to the installation position, on a basis of the selected piece of block information.

3. The management apparatus for an air-conditioning system of claim 1, comprising a data acquiring device configured to acquire status data indicating status of each of the equipment devices, wherein:
    the storage device stores interlock setting information, the interlock setting information having information on an interlock condition that is a condition for performing interlock control, information on an interlock source device that is each of the equipment devices for which the interlock condition is set, information on an interlock target device that is each of the equipment devices subject to interlock control, and information on an interlock operation for operating the interlock target device when the interlock source device satisfies the interlock condition; and
    when the interlock source device satisfies the interlock condition, the controller causes the interlock target device that is assigned the same block identification information as the interlock source device to operate in accordance with the information on the interlock operation.

4. The management apparatus for an air-conditioning system of claim 1, comprising a data acquiring device configured to acquire status data indicating status of each of the equipment devices, wherein:
    the layout drawing is a plan view;
    the controller determines a plane area of the monitored space, on a basis of information on a distance in the monitored space per pixel of the plan view displayed on the display device; and
    in accordance with the plane area of the monitored space corresponding to an installation position of each of the equipment devices that is an air-conditioning unit, the controller controls an airflow velocity of air blown by the air-conditioning unit.

5. The management apparatus for an air-conditioning system of claim 1, comprising a data acquiring device configured to acquire status data indicating status of each of the equipment devices, wherein:
    the storage device stores
        block type information that identifies the monitored space corresponding to each of the regions, and
        schedule setting information in which information on whether the monitored space is used or not according to at least one of time, date, and day of week is set for each piece of the block type information; and
    the controller causes operation of each of the equipment devices installed in the monitored space that is not being used to stop, on a basis of the block type information and the schedule setting information.

6. The management apparatus for an air-conditioning system of claim 1, comprising a data acquiring device configured to acquire status data indicating status of each of the equipment devices, wherein:

the controller computes, for each set of the equipment devices that are air-conditioning units to which the same block identification information is assigned, an average value of differences between set temperatures set for the air-conditioning units and an outside air temperature, on a basis of the status data; and the controller sets the set temperatures of the air-conditioning units so that the computed value becomes smaller than a predetermined value.

7. A management apparatus for an air-conditioning system, which monitors status of and controls operations of a plurality of equipment devices including at least an air-conditioning unit, comprising:

a storage device configured to store information on a layout drawing indicating a layout of one or a plurality of monitored spaces, positional information indicating an installation position of each of the equipment devices in the layout drawing, and block information having range information and block identification information, the range information dividing the layout drawing into regions for at least each of the monitored spaces and indicating a range of each of the regions, the block identification information identifying each of the regions;

a data acquiring device;

a display device; and a controller configured to cause the display device to display the layout drawing that displays an installation position of each of the equipment devices, on a basis of the information on the layout drawing and the positional information, assign, to each of the equipment devices, the block identification information for the region corresponding to the installation position, on a basis of the positional information and the block information, and divide the plurality of equipment devices for each piece of the block identification information, and perform at least one of monitoring of status and control of an operation, wherein the data acquiring device is configured to acquire status data indicating status of each of the equipment devices, wherein the controller causes information related to the status data to be displayed in correspondence with display of each of the equipment devices within the layout drawing.

8. The management apparatus for an air-conditioning system of claim 7, wherein:

the storage device stores block type information that identifies the monitored space corresponding to each of the regions; and on a basis of the status data on each of the equipment devices that is an air-conditioning unit, the controller causes a display within the layout drawing which indicates a reaching range of air blown from an air-conditioning unit that is running, to be displayed only within the region of an installation position of the air-conditioning unit, and within the region with the same block type information.

9. The management apparatus for an air-conditioning system of claim 8, wherein:

the layout drawing is a plan view;

the storage device stores capacity information on each of the equipment devices that is an air-conditioning unit, the capacity information having information on a number of air outlets, a direction of the air outlet in the plan view, a range in a horizontal direction reached by air blown from the air outlet, and a maximum value of a distance reached by air blown from the air outlet;

the data acquiring device acquires information on a direction of air blown from the air outlet with respect to a vertical direction, and an airflow velocity of air blown from the air outlet, as the status data from each of the equipment devices that is an air-conditioning unit;

the controller determines a reaching range of air blown from the air-conditioning unit in the plan view, on a basis of the capacity information, the status data, and information on a distance in the monitored space per pixel of the plan view displayed on the display device; and within the reaching range, the controller causes a display indicating a reaching range of air blown from the air-conditioning unit, to be displayed only within the region of an installation position of the air-conditioning unit, and within the region with the same block type information.

10. The management apparatus for an air-conditioning system of claim 9, wherein in a case where displays indicating the reaching ranges of a plurality of the air-conditioning units overlap, the controller reduces the overlap of the reaching ranges by controlling, for at least one of the plurality of air-conditioning units, at least one of a direction of blown air, an airflow velocity, and stopping of operation.

11. The management apparatus for an air-conditioning system of claim 7, wherein:

the storage device stores block type information that identifies the monitored space corresponding to each of the regions, and indicates whether or not a temperature rise is allowed for the monitored space;

the controller detects each of the equipment devices that is an air-conditioning unit installed in the monitored space for which a temperature rise is not allowed, on a basis of the block type information and the block information; and the controller causes warning information, or a predetermined color corresponding to a warning, to be displayed in the monitored space within the layout drawing, in a case where the controller detects from the status data that the detected air-conditioning unit is in stop status or in an operation mode other than cooling.

12. The management apparatus for an air-conditioning system of claim 7, wherein:

the storage device stores block type information that identifies the monitored space corresponding to each of the regions, and indicates whether or not a temperature rise is allowed for the monitored space;

the controller detects a temperature within the monitored space for which a temperature rise is not allowed, on a basis of the status data; and the controller causes warning information, or a predetermined color corresponding to a warning, to be displayed in the monitored space within the layout drawing, in a case where the detected temperature is higher than a predetermined value.

13. The management apparatus for an air-conditioning system of claim 7, wherein:

the controller detects, for each set of the equipment devices that are air-conditioning units to which the same block identification information is assigned, whether status is run or stop, and whether an operation mode is heating or cooling, on a basis of the status data; and the controller causes information on the detection results, or a color corresponding to the detection results, to be displayed in the region corresponding to the block identification information within the layout drawing.

14. The management apparatus for an air-conditioning system of claim 7, wherein:

the controller detects presence/absence of an abnormality on a basis of the status data, for each set of the equipment devices that are air-conditioning units to which the same block identification information is assigned; and the controller causes information on the detection results, or a color corresponding to the detection results, to be displayed in the region corresponding to the block identification information within the layout drawing.

15. The management apparatus for an air-conditioning system of claim 7, wherein:

the controller computes, for each set of the equipment devices that are assigned the same block identification information, the sum of instantaneous power, the sum of power consumption over a predetermined period, or power consumption per unit area of the region corresponding to the block identification information, on a basis of the status data; and the controller causes information on the computed value, or a color corresponding to the computed value, to be displayed in the region corresponding to the block identification information within the layout drawing.

16. The management apparatus for an air-conditioning system of claim 7, wherein:

the controller computes, for each set of the equipment devices that are assigned the same block identification information, the sum of instantaneous power, the sum of power consumption over a predetermined period, or power consumption per unit area of the region corresponding to the block identification information, on a basis of the status data; and in a case where the computed value exceeds a predetermined value, the controller causes information on the computed value, or a predetermined color, to be displayed in the region corresponding to the block identification information within the layout drawing.

17. The management apparatus for an air-conditioning system of claim 7, wherein:

the controller computes, for each set of the equipment devices that are assigned the same block identification information, the sum of instantaneous power, the sum of power consumption over a predetermined period, or power consumption per unit area of the region corresponding to the block identification information, on a basis of the status data, and stores the computed value;

the controller determines an increase/decrease value of the computed value that is presently computed with respect to the stored computed value; and the controller causes information on the increase/decrease value, or a color corresponding to the increase/decrease value, to be displayed in the region corresponding to the block identification information within the layout drawing.

18. The management apparatus for an air-conditioning system of claim 7, wherein:

the controller computes, for each set of the equipment devices that are air-conditioning units to which the same block identification information is assigned, an average value of differences between set temperatures set for the air-conditioning units and a temperature within the monitored space, on a basis of the status data; and the controller causes information on the computed value, or a color corresponding to the computed value, to be displayed in the region corresponding to the block identification information within the layout drawing.

19. The management apparatus for an air-conditioning system of claim 7, wherein:

the controller computes, for each set of the equipment devices that are air-conditioning units to which the same block identification information is assigned, an average value of differences between set temperatures set for the air-conditioning units and an outside air temperature, on a basis of the status data; and the controller causes information on the computed value, or a color corresponding to the computed value, to be displayed in the region corresponding to the block identification information within the layout drawing.

20. The management apparatus for an air-conditioning system of claim 7, comprising an input device configured to input a setting of a target set temperature for each of the monitored spaces, wherein:

the controller computes, for each set of the equipment devices that are air-conditioning units to which the same block identification information is assigned, an average value of differences between set temperatures set for the air-conditioning units, and the target set temperature set for each of the monitored spaces, on a basis of the status data; and the controller causes information on the computed average value, or a color corresponding to the computed average value, to be displayed in the region corresponding to the block identification information within the layout drawing.

* * * * *